United States Patent [19]
Takahashi

[11] Patent Number: 5,323,382
[45] Date of Patent: Jun. 21, 1994

[54] DISC CARTRIDGE

[75] Inventor: Kenji Takahashi, Miyagi, Japan

[73] Assignee: Sony Corporation, Tokyo, Japan

[21] Appl. No.: 922,015

[22] Filed: Jul. 28, 1992

[30] Foreign Application Priority Data

| Jul. 31, 1991 | [JP] | Japan | 3-213115 |
| Sep. 30, 1991 | [JP] | Japan | 3-278631 |
| Nov. 30, 1991 | [JP] | Japan | 3-341934 |

[51] Int. Cl.$^5$ ............ G11B 33/00; G11B 23/033
[52] U.S. Cl. .................... 369/291; 360/133; 206/444
[58] Field of Search ............ 369/251; 360/133; 206/444

[56] References Cited

U.S. PATENT DOCUMENTS

| 4,794,479 | 12/1988 | Nakanishi | 360/133 X |
| 4,812,937 | 3/1989 | Nemoto et al. | 360/133 |
| 4,851,948 | 7/1989 | Kato et al. | 360/133 |
| 4,853,925 | 8/1989 | Kaneuchi | 360/133 |
| 4,858,050 | 8/1989 | Ashe et al. | 360/133 |
| 4,874,085 | 10/1989 | Grobecker et al. | 206/444 X |
| 5,034,844 | 7/1991 | Shiba et al. | 360/133 |
| 5,043,974 | 8/1991 | Nakagawa | 206/444 X |
| 5,081,556 | 1/1992 | Ikebe et al. | 206/444 X |
| 5,084,861 | 1/1992 | Takahashi | 206/444 X |
| 5,111,446 | 5/1992 | Fujita | 369/291 |
| 5,161,081 | 11/1992 | Machida et al. | 360/133 |
| 5,175,726 | 12/1992 | Imokawa | 369/291 |

FOREIGN PATENT DOCUMENTS

| 0216708A3 | 4/1987 | European Pat. Off. . |
| 0209892 | 1/1987 | EPC . |
| 0215958 | 4/1987 | EPC . |
| 0244132 | 11/1987 | European Pat. Off. ............ 360/133 |
| 0248908 | 12/1987 | EPC . |
| 0320492 | 6/1989 | EPC . |
| 0351160 | 1/1990 | EPC . |
| 0385740 | 9/1990 | EPC . |
| 0533463 | 3/1993 | EPC . |
| DE3804262 | 8/1988 | Germany . |
| 2146483A | 4/1985 | United Kingdom . |

OTHER PUBLICATIONS

IBM Technical Disclosure Bulletin, vol. 24, No. 1A, Jun. 1981, p. 216; Henderson: "Flexible Disk Cartridge Arrangement".
Patent Abstracts of Japan, vol. 13, No. 434 (M-875) (3782), 28 September 1989 & JP-A-11 66 922 (Mitsubishi Metal Corp).
Patent Abstracts of Japan, vol. 12, No. 113 (M-683), 9 April 1988 & JP-A-62 240 521 (Matsushita Electric Ind. Co. Ltd.).

Primary Examiner—Edward K. Look
Assistant Examiner—Hoang Nguyen
Attorney, Agent, or Firm—Philip M. Shaw, Jr.

[57] ABSTRACT

A disc cartridge for an optical disc having a magnetic member attached to a central portion of one of two major surfaces of a disc substrate, wherein the cartridge includes a cartridge main body rotatably accommodating the optical disc, a recessed, inner surface portion for keeping a clearance between an inner surface of the cartridge main body and a protuberance produced by attaching the magnetic member to the one of the two major surfaces of the disc substrate, a first lug formed at a first position on the inner surface of the cartridge main body facing the magnetic member and a second lug formed at a second position on the inner surface of the cartridge main body facing the one of the major surfaces of the optical disc, wherein the height of the first lug is less than the height of the second lug, such that the first lug is contacted by the magnetic member when the disc substrate is loaded onto a disc table inserted into the disc cartridge.

Recording/reproducing access apertures are formed in opposite positions of an upper cartridge half and a lower cartridge half making up the cartridge main body, and a reinforcement, including abutting projections and ribs, is provided at side edges of the recording/reproducing apertures located at an outer rim of an optical disc housed within the cartridge main body.

20 Claims, 24 Drawing Sheets

DISC CARTRIDGE

BACKGROUND OF THE INVENTION

1. Field of the Invention

This invention relates to a disc cartridge housing therein a disc on which desired information signals are recorded, such as an optical disc or a magneto-optical disc, and, above all, a disc which may be clamped to a disc rotating and driving unit by taking advantage of the force of magnetic attraction.

2. Description of the Prior Art

There has hitherto been proposed a disc for recording desired information signals, such as an optical disc or a magneto-optical disc.

The disc of this type of an extremely small size capable of recording information signals with high density is proposed. For example, in the case of a magneto-optical disc, a disc having a diameter of not more than 64 mm, is proposed.

The magneto-optical disc which is small-sized and capable of high density recording is loaded on the disc rotating and driving unit and rotated at a higher velocity. As the disc is rotated at the higher velocity, a light beam from an optical pickup is irradiated on one or more fine recording tracks formed on a major disc surface, while an external magnetic field is applied by a magnetic head, to record desired information signals on the disc.

For accurately irradiating the light beam on the fine recording track during the high velocity disc rotation, it is necessary for the magneto-optical disc to be positively secured to a disc table of the disc rotating and driving device and to be loaded thereon with the center of rotation of the disc correctly aligned with the axis of the disc table.

For positively loading and securing the small-sized magneto-optical disc on the disc table with high accuracy, there is proposed a disc loading system in which a metallic plate formed of a magnetic metal material is arranged on the magneto-optical disc and attracted by a magnet provided on the disc table for clamping the disc to the disc table.

A magneto-optical disc 1 shown in FIGS. 1 and 2 is proposed as a magneto-optical disc employed in such disc clamping system which makes use of the magnetic force of attraction. The magneto-optical disc 1, shown in FIGS. 1 and 2, is provided with a disc substrate 2 formed as a transparent polycarbonate resin. A signal recording layer for recording desired information signals is deposited on one major surface 2a of the disc substrate 2. The opposite major surface 2b of the disc is a write/read surface. It is from the side of this write/read surface that the light beam is radiated from an optical head to the signal recording layer for recording or reproducing information signals.

Referring to FIGS. 1 and 2, a centering hole 3, engaged by a centering member arranged on the disc table of the disc rotating and driving unit, is formed at the center of the disc substrate 2. A recess 5 for housing a metallic plate 4, which is a magnetic member attracted by a magnet provided on the disc table, is formed at the center of the major surface 2a of the disc substrate 2. The recess 5 has a depth significantly larger than the thickness of the metallic plate 4. The metallic plate 4, housed within the recess 5, is formed with a downturned peripheral part 4a and a resting part 4b which is contiguous to the peripheral part 4a and rests on a resting surface 5a on the bottom of the recess 5. That is, the metallic plate 4 is formed as a cap having a height corresponding to the vertical height on the downturned part 4a and having the flange-shaped resting part 4b continuous to the downturned part 4b.

The above-described metallic plate 4 is housed within the recess 5 with the resting part 4b resting on the resting surface 5a so that a gap is defined between the outer surface of the bent part 4a and the inner surface of the recess 5. The metallic plate 4 is supported in the recess 5 by having the resting part 4b supported by a plurality of, e.g. four supporting projections 5b formed by locally thermally deforming the rim of the recess 5.

Meanwhile, an annular step 6 is formed at the center of the major surface 2b of the disc substrate 2 for surrounding the center hole 3, as shown in FIG. 2. The function of the annular step 6 is to increase the depth relative to the centering hole 3 of a centering member provided on the disc table on which the magneto-optical disc is loaded to assure positive centering of the disc 1 with respect to the disc table.

The metallic plate provided on the magneto-optical disc employed in the disc loading system which makes use of the magnetic force of attraction is attached to the major surface of the magneto-optical disc, such as with an adhesive, for closing the centering hole bored at the center of the magneto-optical disc. When the magneto-optical disc, having the metallic plate attached thereto, is set on the disc table, it is clamped to the disc table, under the force of attraction by the magnet provided thereon for rotation in unison with the disc table.

The magneto-optical disc, capable of high-density recording of information signals, is housed in a cartridge main body, as a disc cartridge, to prevent deterioration of recording/reproducing properties due to deposition of dust and dirt or damage, and is loaded on the recording/reproducing apparatus or laid in store in this state.

FIG. 3 shows an arrangement of the disc cartridge.

Referring to FIG. 3, the disc cartridge includes a rectangular cartridge main body 9 formed by abutting and connecting an upper half 7 and a lower half 8 to each other for housing the magneto-optical disc 1 therein. A disc housing section is provided in the cartridge main body 9 for rotatably housing the magneto-optical disc 1.

The cartridge main body 9 is formed with an inlet opening 10 into which the disc table of the disc rotating and driving unit rotationally driving the cartridge main body 9 is introduced when the disc cartridge is loaded on the recording/reproducing apparatus. Referring to FIG. 5, the inlet opening 10 is a circular opening formed at the mid part of the lower half 7 for exposing the inner peripheral region inclusive of the centering hole 3 of the magneto-optical disc housed within the cartridge main body 9 set on the disc table.

The upper and lower surfaces of the cartridge main body 9, that is the upper and lower halves 7 and 8, are formed with recording/reproducing apertures 11, 12 for exposing at least a part of the signal recording region of the magneto-optical disc 1 accommodated in the cartridge main body 9 to the outside across the inner and the outer peripheries of the disc. Referring to FIG. 3, the recording/reproducing apertures 11 and 12 are formed as rectangular apertures at a transversely mid part of the cartridge main body 9 extending from a position close to the inlet opening 10 towards the front side of the cartridge main body 9.

A shutter member 13 is provided on the cartridge main body 9 for closing the recording/reproducing apertures 11, 12 to prevent dust and dirt from entering by means of the apertures 11, 12 into the inside of the cartridge main body 9 and depositing on the magneto-optical disc 1. The shutter member 13 is formed by punching and bending a thin metallic plate into a rectangular frame having a U-shaped cross-section and is composed of shutter sections 13a, 13b closing the recording/reproducing apertures 11 and 12 and a connecting web 13c interconnecting the distal parts of the shutter sections 13a, 13b. A slide guide 13d is formed at one side of the connecting web 13c for guiding the shutter member 13 parallel to the front side of the cartridge main body 9.

The shutter member 13 is fitted on the front side of the cartridge main body 9 so that the shutter sections 13a, 13b are extended over the recording/reproducing apertures 11, 12. The shutter member 13 is mounted on the cartridge main body 9 for sliding between a position of closing the recording/reproducing apertures 11, 12 as shown by solid line in FIGS. 4 and 5 and a position of opening the recording/reproducing apertures as shown by broken lines in FIG. 4.

Referring to FIGS. 3 and 4, a shutter locking member 14 is provided at a corner on the front side of the lower half 7 of the cartridge main body 9 for being engaged with an engaging part 13e formed by partially bending the slide guide 13d for maintaining the shutter member 13 at a closure position for thereby preventing inadvertent movement of the shutter member 13 away from the position of closing the recording/reproducing apertures 11, 12.

The shutter locking member 13 is formed by molding synthetic resin and, as shown in FIG. 3, includes an attachment part 14a at a proximal side thereof for attachment to the lower half 7 and a locking arm 14b extending along a curved path from one end of the attachment part 14a. The distal end of the locking arm 14b is formed with an engaging notch 14c engaged by the engaging part 13e of the shutter member 13. The connection portion of the locking arm 14b to the proximal attachment part 14a is a resilient flexible section of a reduced thickness 14d.

The shutter locking member 14 is mounted on the lower half 7 with a pair of attachment pins 7a, 7b of the lower half 7 engaged in through-holes 14e, 14e formed ion the attachment part 14a and with the engaging notch 14c facing the front side of the cartridge main body 9, as shown in FIG. 3.

When the shutter member 13 mounted on the cartridge main body 4 is slid to a position closing the recording/reproducing apertures 11, 12, as shown in FIG. 4, the mating engaging part 13e is engaged in the engaging notch 14c of the shutter locking member 14, which is thereby locked in the position of closing the recording/reproducing apertures 11, 12.

When the above-described disc cartridge which is provided with the shutter locking member 14 for locking the shutter locking member 13 at the position of closing the recording/reproducing apertures 11 and 12, is introduced into a cartridge loading unit of the recording/reproducing apparatus, with the direction shown by arrow A in FIG. 4 as an inserting direction, a shutter actuating pin 16 provided in the recording/reproducing apparatus is intruded into an inlet groove 15 formed on the front side of the cartridge main body 9. As the disc cartridge is introduced into the disc loading unit, the shutter actuating pin 16 rides on the locking arm 14b of the shutter locking member 14, from the outer lateral side of the proximal end towards the distal end thereof, for resiliently flexing the flexible section 14d and thrusting the locking arm 14b into the inside of the cartridge main body 9, as shown by arrow B in FIG. 6. As a result of the movement of the locking arm 14b into the inside of the cartridge main body 9, the mating engaging part 13e ceases to be engaged in the engaging notch 14c, so that the shutter member 13 is moved by the shutter actuating pin 16 in the direction of opening the recording/reproducing apertures 11 and 12.

As best seen in FIGS. 7 and 8, the cartridge main body 9 of the disc cartridge is formed by an upper half 8 and a lower half 7 abutted and connected to each other and is provided with annular supporting ribs 8a, 7b on the inner sides of the upper half 8 and the lower half 7 for supporting a non-recording region N of the magneto-optical disc 1 about the rim of the center hole 3 of the magneto-optical disc 1. By providing these annular supporting ribs 7b, 8a on the cartridge main body 9, the magneto-optical disc 1 is housed within the cartridge main body 9 so that signal recording region extending from the rim of the outer rim of the non-recording region N to the vicinity of the outer rim of the disc 1 is out of contact with the inner surface of the cartridge main body 1. In this manner, the magneto-optical disc 1 may be rotatably accommodated in the cartridge main body 9 so that the signal recording region S is not injured with e,g, grazing.

Meanwhile, if the supporting projections 5b for the metallic plate 5 are formed by thermally deforming several rim portions of the recess 5 as shown in FIGS. 1 and 2, there is a risk that a pointed protuberance 2c can be formed on the one major surface 2a of the disc substrate 2, as shown in FIG. 2.

If the disc having such pointed projection on the major surface of the disc substrate is accommodated in the cartridge main body, there is a risk that the protuberance may contact with the inner surface of the cartridge main body to produce debris removed from the protuberance, such debris being then deposited on the write/read surface of the magneto-optical disc to render it impossible to write and/or read information signals.

Above all, the disc cartridge housing a small-sized magneto-optical disc is of small plan size and thickness, so that the disc housing section in the cartridge main body is also of a thickness only slightly larger than the thickness of the magneto-optical disc. If the above-described protuberance is formed on the disc substrate, it is not possible to prevent the protuberance and the inner surface of the cartridge main body from contacting each other, so that the debris is inevitably produced.

Another problem is that since the supporting rib 8a formed on the upper half 8 supporting the magneto-optical disc 1 is formed as a ring and hence supports only the non-recording region N of the magneto-optical disc 1, a space A is generated between the metallic plate 4 disposed on the radially inner side of the supporting rib 8a and the inner surface of the supporting rib 8a when the magneto-optical disc 1 is thrust upwards towards the upper half 8, as shown in FIG. 8. The result is that, if the metallic plate 4 is thrust by means of the centering hole 3 communicating with the inlet opening 10 and is subjected to a pressure lifting it in the direction shown by arrow y in FIG. 8, only the magneto-optical disc 1 is abutted and thrust by the supporting rib 8a so that the metallic plate 4 may be detached from the disc 1.

If the metallic plate 4 becomes detached in this manner, the magneto-optical disc 1 cannot be attracted and clamped by the magnet provided on the disc table, so that the magneto-optical disc 1 cannot be rotated and hence information signals can not be recorded or reproduced.

The disc cartridge shown herein is of a rectangular shape of as small a size as possible, in association with the size of the disc to be housed therein, for ease of handling and for reducing the size of the recording and/or reproducing apparatus.

With such a disc cartridge, the portion of the disc cartridge provided with the recording/reproducing apertures is lowered in rigidity so that it becomes impossible to assure sufficient rigidity of the cartridge main body, and cartridge main body tends to be flexed and deformed under a smaller external force.

Furthermore, because a groove engaged by a retainer for the shutter member attached to the cartridge main body is formed on the lateral side of the cartridge main body provided with the recording/reproducing apertures and extends along the direction of movement of the shutter member, this portion of the cartridge main body is lowered significantly in rigidity, so that sufficient strength can not be assured. Besides, the shutter member attached to the disc cartridge tends to be detached.

On the other hand, with a disc cartridge in which a groove for permitting entrance of a shutter actuating member for opening the shutter member is formed in the front side of the cartridge main body along which the shutter member is slid, the front side of the cartridge main body which is provided with the groove undergoes significant flexure and deformation because the peripheral wall is removed for forming the groove.

Further, since the shutter locking member of he conventional disc cartridge is formed as a resin molded member, it is extremely difficult to mold the shutter locking member with high accuracy because thermal shrinkage produced at the time of molding.

Besides, in the conventional shutter locking member 13 in which the locking arm 14b is extended by means of the resilient flexible section 14d form one end of the attachment section 14a, it is not possible to assure constant height h from the attachment section 14a as a mounting reference to the cartridge main body 9 to the top of the locking arm section 14b in which the engaging notch 14c is formed. The result is that, when the shutter locking member 13 is attached to the cartridge main body 9 with the attachment section 14a as the mounting reference, it is not possible to assure a constant position of the locking arm 14b facing the groove 15 for the shutter actuating member formed in the front side of the cartridge main body 9, so that the shutter locking member 13 is subjected to variable deflection under a thrust exerted by the shutter actuating pin 16. Thus a stable unlocking operation of the shutter member 13 can not be assured.

Besides, there is a risk that the mating engaging part 13e can not be engaged positively in the engaging notch 14c so that the shutter member 13 can not be positively locked at the position of closing the recording/reproducing apertures 11 and 12 so that there is the risk that the apertures can be inadvertently opened to injure the magneto-optical disc 1 housed within the cartridge main body 9.

In view of the above described status of the art, it is a primary object of the present invention to provide a disc cartridge comprised of a cartridge main body and a disc housed therein, which disc includes a disc substrate of synthetic resin formed with a centering hole and a magnetic plate mounted on one of the major surfaces of the disc substrate for closing the centering hole, in which a clearance for evading protruding parts occasionally formed as a result of attachment of the magnetic plate to the disc substrate is provided on the inner surface of the cartridge main body.

It is a second object of the present invention to provide a disc cartridge in which the magnetic plate can be prevented from being detached from the magneto-optical disc even if an inadvertent force to applied to the magnetic plate.

It is a third object of the present invention to provide a disc cartridge in which the cartridge main body can be prevented from being lowered in rigidity as a result of providing the recording/reproducing apertures for allowing the signal recording region of the disc to be exposed to the outside across the inner and outer disc peripheries for assuring sufficient strength, and in which the disc cartridge can be prevented from being flexed or deformed under a small external force, thereby assuring positive protection of the disc.

It is a fourth object of the present invention to provide a shutter locking mechanism of a disc cartridge in which, even when the shutter member is formed of synthetic resin, the shutter member can be positively locked at a position of closing the apertures provided in the cartridge main body for assuring positive protection of the disc accommodated in the disc cartridge.

DETAILED DESCRIPTION OF THE PREFERRED EMBODIMENTS

Figure 1:
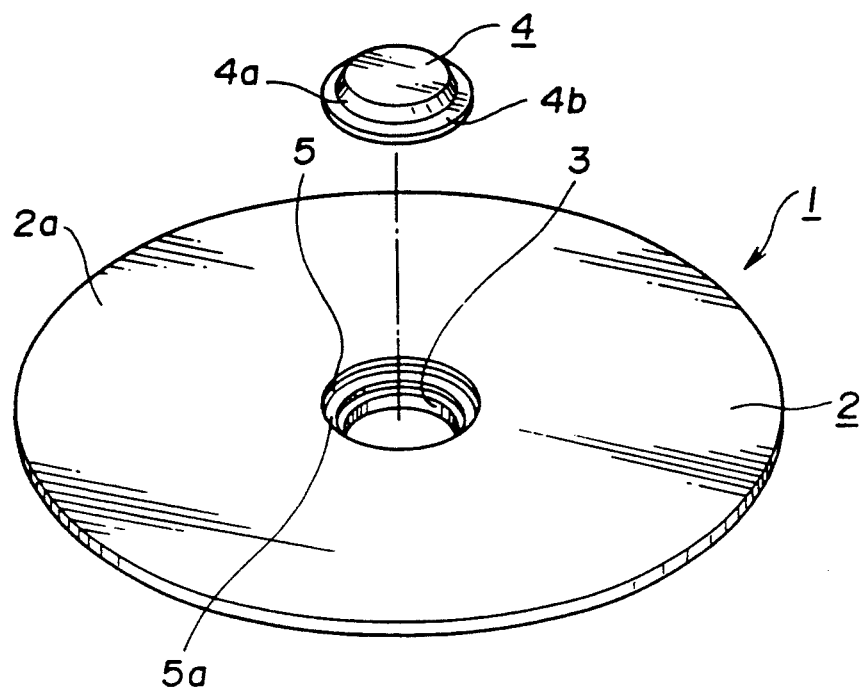
FIG. 1 is a perspective assembly view showing a magneto-optical disc accommodated within a conventional disc cartridge.
Figure 2:
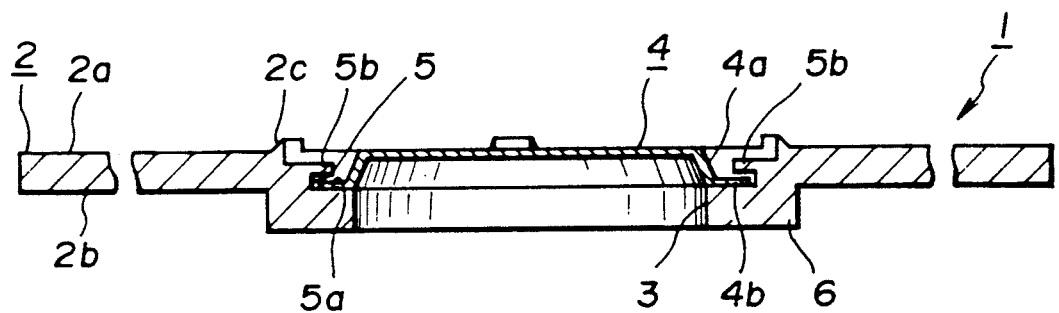
FIG. 2 is a cross-sectional view of the magneto-optical disc in which a metal plate is attached to a disc substrate.
Figure 3:
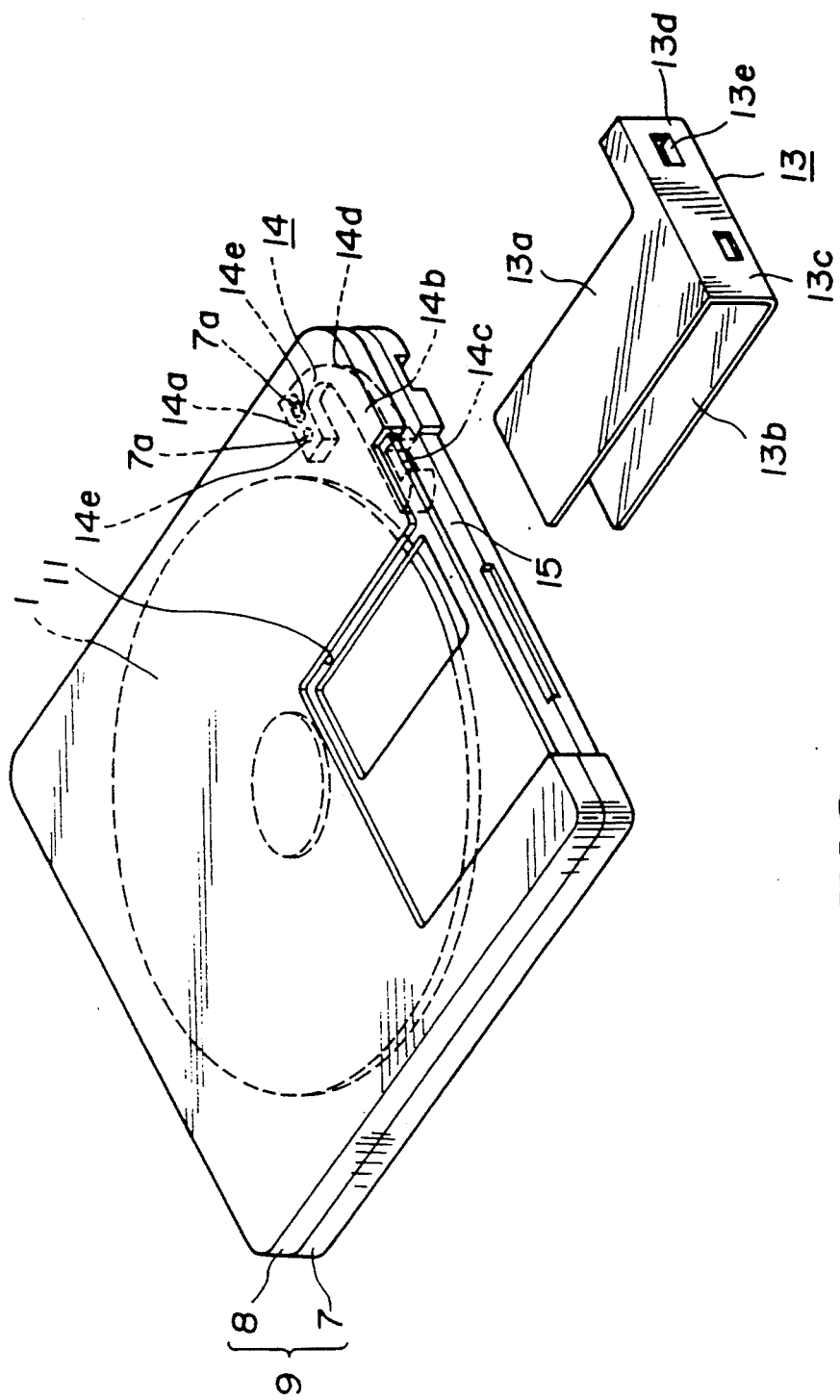
FIG. 3 is an exploded perspective view showing a conventional disc cartridge.
Figure 4:
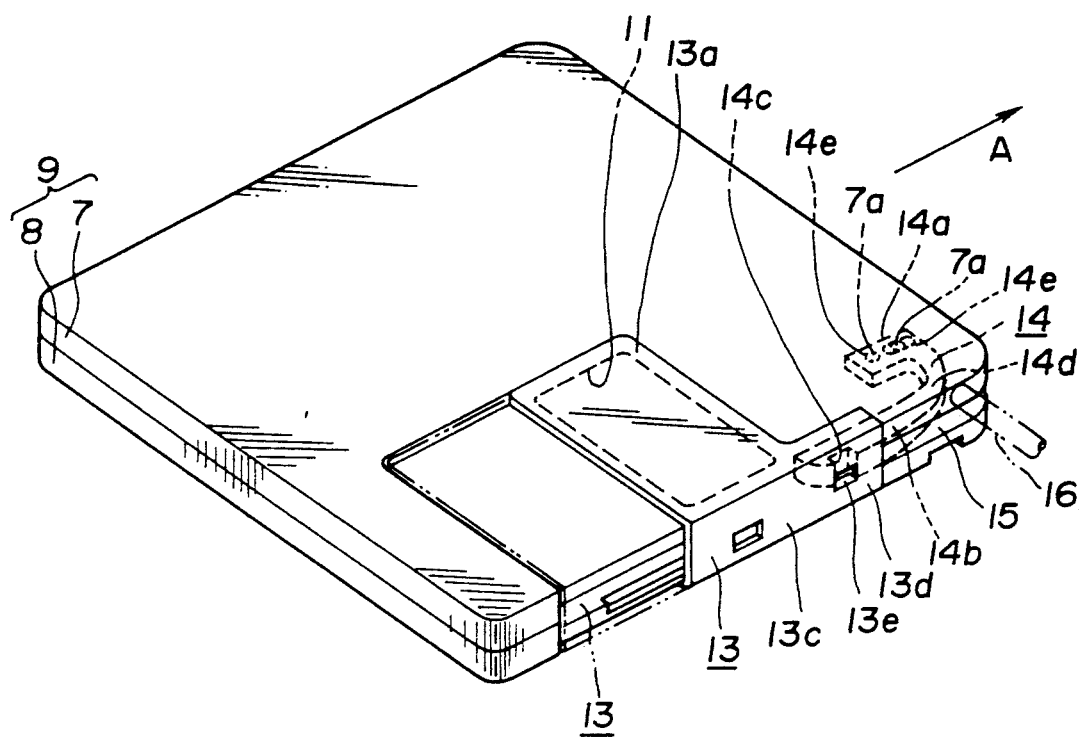
FIG. 4 is a perspective view showing the conventional disc cartridge from the upper side.
Figure 5:
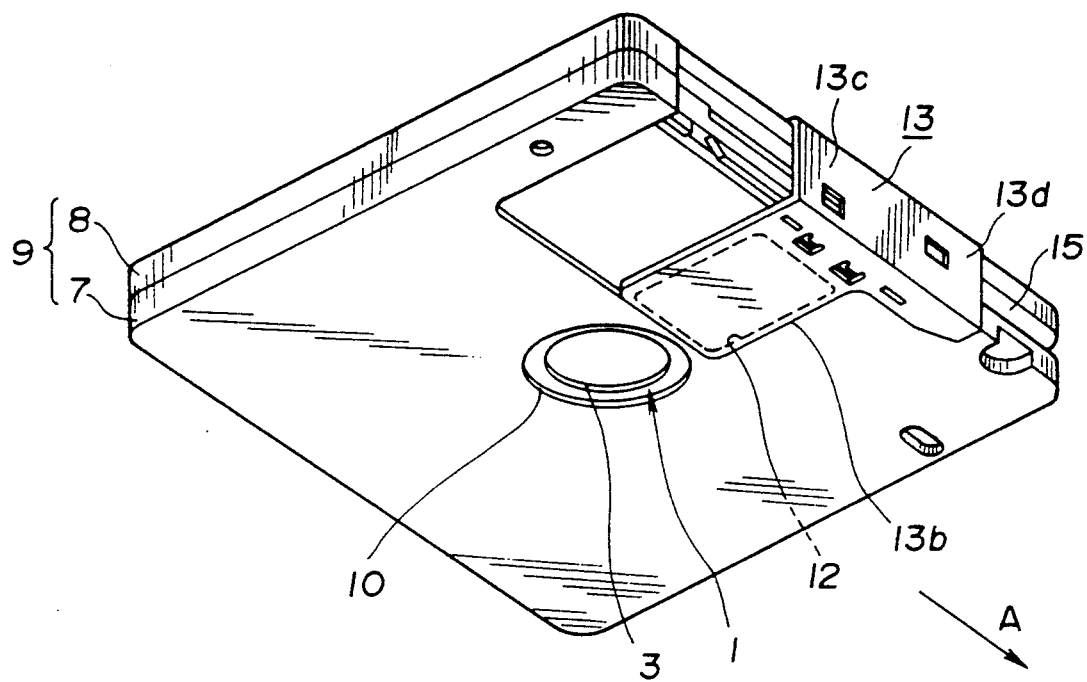
FIG. 5 is a perspective view showing the conventional disc cartridge from the lower side.
Figure 6:
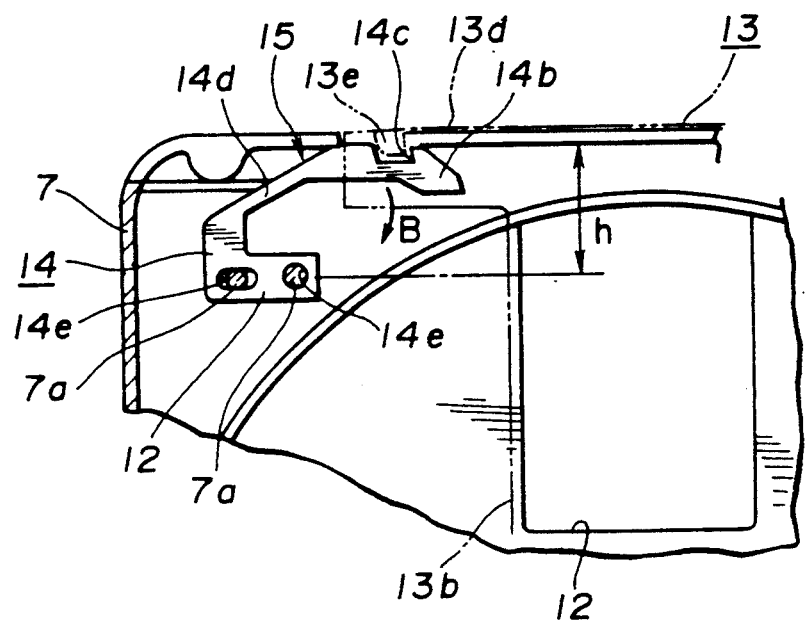
FIG. 6 is a partial plan view of a cartridge main body showing a shutter mechanism of the conventional disc cartridge.
Figure 7:
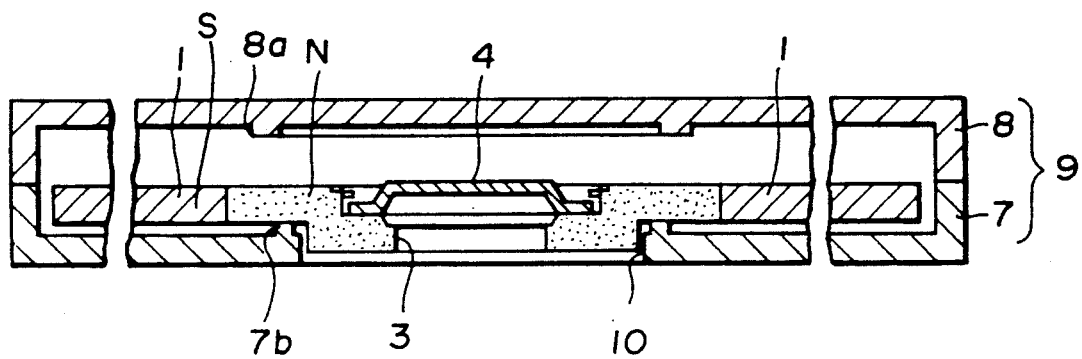
FIG. 7 is a cross-sectional view showing the conventional disc cartridge.
Figure 8:
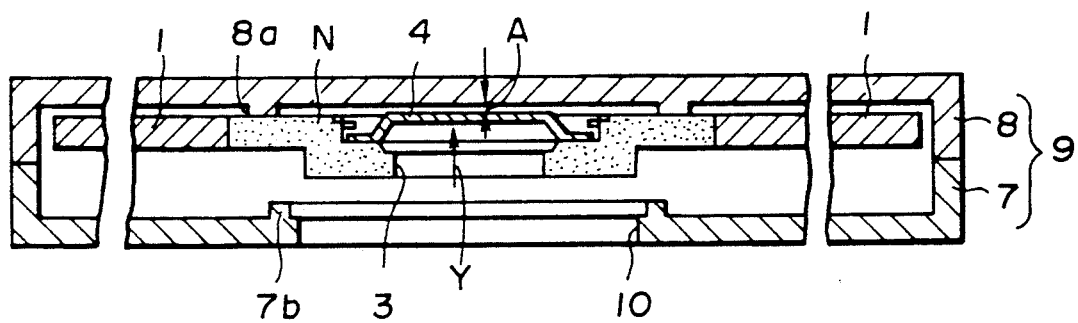
FIG. 8 is a cross-sectional view showing a magneto-optical disc raised towards the upper half within the conventional disc cartridge.

Referring to the drawings, certain preferred embodiments of the present invention will be explained in detail.

Figure 9:
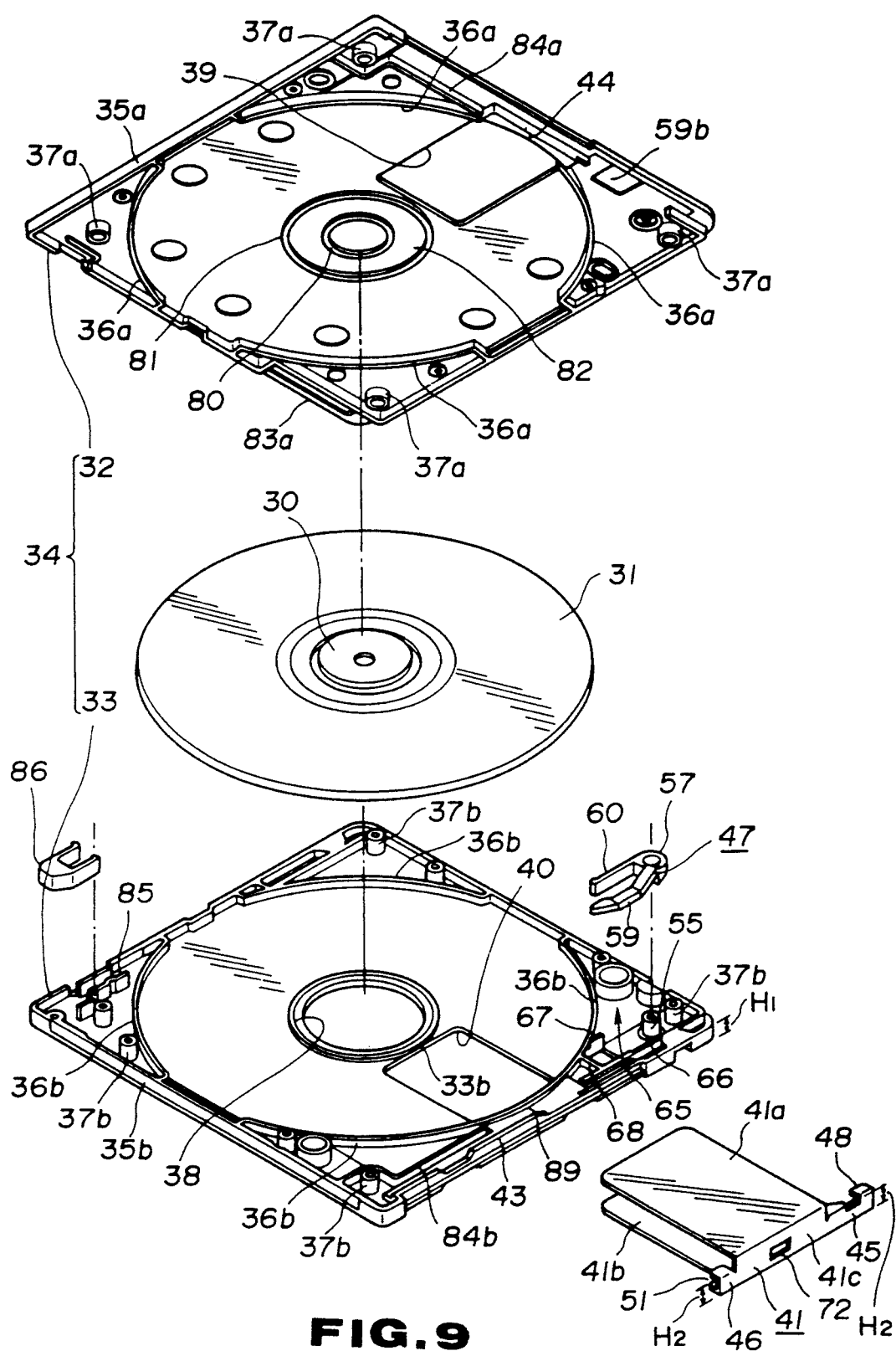
FIG. 9 is an exploded perspective view of a disc cartridge according to a first embodiment of the present invention.

A disc cartridge, to which a shutter locking mechanism according to the present invention is applied, is first explained by referring to FIG. 9. Similarly to the above-described conventional disc cartridge, the present disc cartridge shown in FIG. 9 includes a rectangular cartridge main body 34 made up of an upper half 32 and a lower cartridge half 33 abutted and connected to each other. Within the cartridge main body 34, a disc-shaped recording medium, such as a magneto-optical disc 31 capable of re-recording information signals, is rotatably accommodated to make up a disc cartridge.

Meanwhile, upstanding peripheral wall sections 35a, 35b, abutted to each other for constituting an outer peripheral wall 35 of the cartridge main body 34, are formed on the outer perimeter of the upper half 32 and the lower half 33 of the cartridge main body 34, respectively. Upstanding wall sections 36a, 36b, are formed on the confronting inner surfaces of the upper half 32 and the lower half 33 for being abutted to each other for constituting a disc housing section. These wall sections 36a, 36b are each formed for defining an arc of a circle inscribing the upstanding peripheral wall sections 35a, 35b. The corner sections of the confronting inner surfaces of the upper half 22 and the lower half 33 are formed with corner projections 37a, 37b, respectively, fitting one into the other.

An annular plate support 80 and an annular supporting lug 81 concentric with the support 80 are formed at the center of the inner surface section delimited by the wall section 36a so that the support 80 and the lug 81 are projected from the inner surface of the upper half 32 for being abutted on a metal plate 30 of the magneto-optical disc 31 as later explained. A recess 82 delimited by the plate support 80 and the supporting lug 81 provide a clearance for evading a protuberance which is generated when mounting the metal plate 30 on the magneto-optical disc 31 as later described. A half rib 84a is formed on an outer side of the wall section 36a of the upper half 32 for being extended along the lateral side of the upper half 32 on which a shutter member 41 as later explained is mounted. A step 83a is formed at a diametrally opposite position of the upper half 32 with respect to the half rib 84a.

A mating half rib 83b and a mating step 84b is formed on the inner surface of the lower half 33 for facing the half rib 84a of the upper half 32. When the upper and lower halves 32 and 33 are connected to each other, the step 83a defines a groove for preventing mistaken insertion of the disc cartridge into the inside of the recording/reproducing apparatus.

A guide manner 85 is mounted for being projected from the inner surface of the lower half 33 at the corner thereof diametrally opposite to a corner of the lower half 33 which provided with the shutter locking member 47. The guide member 85 is embraced by a write-product operating knob 86 having a pair of arm sections. The operating knob 86 can be accessed for displacement through apertures, not shown, formed by segmenting a part of the upstanding peripheral wall sections 35a, 35b of the upper and lower halves 32, 33 for opening or closing a detection opening 33a formed in the lower half 33. By opening or closing the detection opening 33a with the operating knob 86 in this manner, it possible to check whether or not information signals may be recorded on the magneto-optical disc 31.

By abutting the upstanding peripheral wall sections 36a, 36b and half ribs 84a, 84b and by fitting and welding the projections 37a, 37b to each other, the upper and the lower cartridge halves 32, 33 may be connected to each other to form the cartridge halves 32, 33 may be connected to each other to form the cartridge main body 34 rotatably housing the optical disc 31.

The cartridge main body 34, thus formed by abutting and connecting the upper half 32 and the lower half 33 to each other, is formed with an aperture 38 into which a disc table of a disc rotating and driving device is intruded for rotationally driving the magneto-optical disc 31 housed within the cartridge main body 31 when the disc cartridge is loaded in the recording/reproducing apparatus. The aperture 38 is a circular aperture formed at a mid part of the lower half 32, as shown in FIG. 9, for exposing a rim of a center aperture 31a of the magneto-optical disc 31 housed within the cartridge main body 34 which is closed by the metal plate 30 for magnetic clamping.

Figure 10:
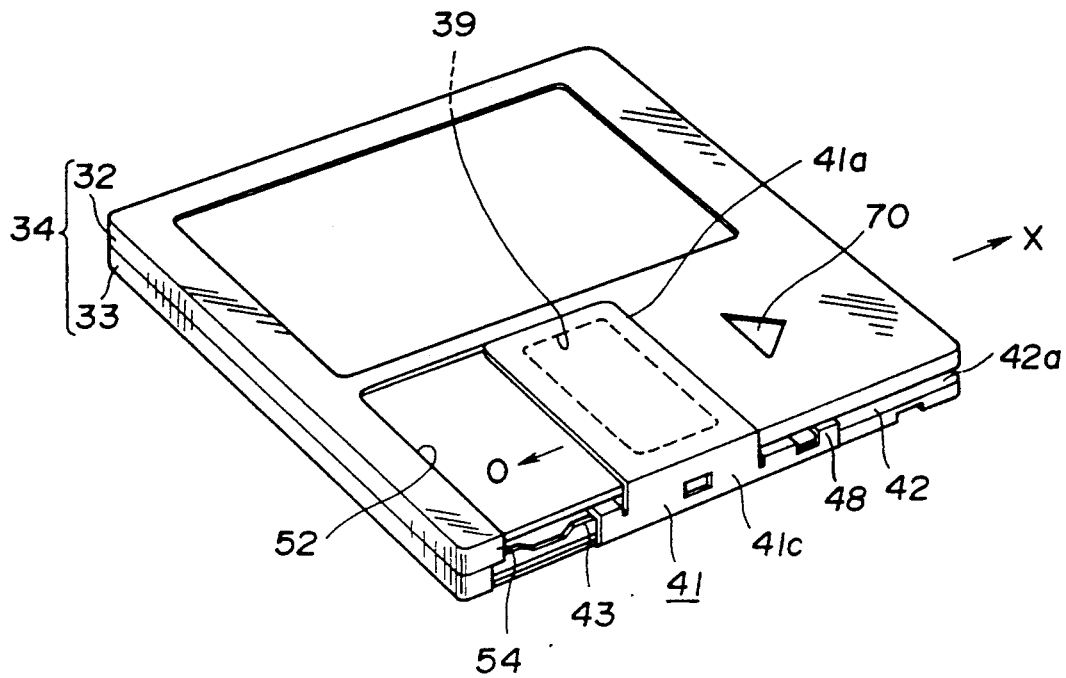
FIG. 10 is a perspective view showing the disc cartridge shown in FIG. 9 from the upper side.
Figure 11:
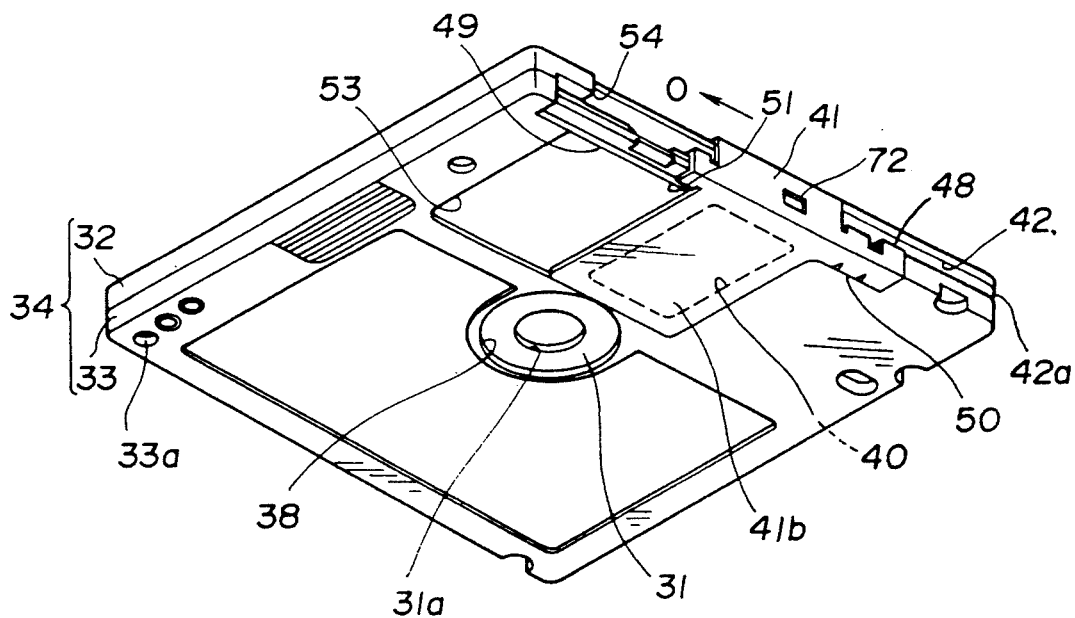
FIG. 11 is a perspective view showing the disc cartridge shown in FIG. 9 from the lower side.

The upper and lower surfaces of the cartridge main body 34, that is the upper and lower halves 32, 33, are formed with recording/reproducing apertures 39, 40 for exposing at least a part of the signal recording region of the magneto-optical disc 31 to the outside, respectively. As shown in FIGS. 9, 10 and 11, these apertures 39 and 40 are rectangular apertures disposed at a transversely mid part of the front side of the cartridge main body 34 and extended from the vicinity of the aperture 38 as far as the front side of the cartridge main body.

The shutter member 41 is movably mounted on the front side for opening and closing the recording/reproducing apertures 39, 40 so that the apertures 39, 40 may be closed by the shutter member 41 for preventing foreign matter from intruding into the inside via these apertures 39, 40.

The front side of the cartridge main body 34, along which the shutter member 41 is moved, is formed with a groove 42 into which is inserted a shutter opening pin which is provided on the recording/reproducing apparatus for displacing the shutter member 41. As shown in FIGS. 10 and 11, the groove 42 has a terminal end 42a at a lateral side of the cartridge main body 34 which is orthogonal to he front side thereof and is formed for being extended along the direction of movement of the shutter member 41.

A shutter slide guide wall 43 is formed within the groove 42 for assuring stable movement of the shutter member 41. As shown in FIG. 9, the wall 43 is formed upright on the front side of the lower half 33.

An abutment wall 44 is formed on the front side edge of the recording/reproducing aperture 39 formed in the upper half 32 so that the wall 44 may be abutted on the inner surface of the front side of the lower half 33 for preventing flexure of the cartridge main body 34 along the thickness thereof at the site of the groove 42, as later described.

The shutter member 41 for opening or closing the recording/reproducing apertures 39, 40 is formed by bending a thin metal sheet into the cross-sectional shape of a letter U which is made up of shutter parts 41a, 41b closing the apertures 39, 40, respectively and a connecting web 41c interconnecting the proximal ends of the shutter parts 41a, 41b.

First and second slide guides 45, 46 are formed on both sides of the connecting web 41c for stably guiding the shutter member 41 along the front side of the cartridge main body 34. These first and second slide guides 45, 46 are bent in the form of a letter U having a height $H_2$ substantially corresponding to a height $H_1$ of the front side of the lower half 33.

The distal end of the first slide guide 45 is formed with an engaging part 48 which is inserted into the groove 42 formed in the front side of the cartridge main body 34 when the shutter member 41 is mounted on the cartridge main body 34. The engaging part is engaged with the shutter locking member 47 provided within the cartridge main body 34.

The distal ends of the first and second slide guides 45, 46 extending to the lower half 33 are formed with extrication proofing guide lugs 50, 51 for engaging with a guide groove 49 formed on an outer lateral surface of the lower half 33 for guiding the movement of the shutter member 41 and inhibiting extrication of the shutter member 41 from the cartridge main body 34.

Referring to FIGS. 10 and 11, the shutter member 41 is fitted to the front side of the cartridge main body 34, so that the shutter parts 41a, 41b are extended over the recording/reproducing apertures 39, 40.

At this time, the first and second slide guides 45, 46 are engaged with the front side of the lower half 33, with the guide lugs 50, 51 being engaged with the guide groove 39 and with the portion 48 of the first slide guide 45 introduced into the groove 42 being extended over the upper end face of a slide guide wall section 42. The engaging part 48, formed as one with the first slide guide 45, is protruded into the groove 42.

The shutter member 41, thus fitted to the cartridge main body 34, with the first and second slide guides 45, 46 clamping the front side of the lower half 33, is mounted on the cartridge main body 34 for sliding between a position of closing the recording/reproducing apertures 39, 40 and a position of opening the recording/reproducing apertures, in such a manner that the shutter member 41 is guided during its sliding movement by the guide groove 49 engaged by the guide lugs 50, 51 and the first and second slide guides 45, 46 are prevented from being wobbled during its sliding movement by the slide guide wall section 43.

Slide guide recesses 52, 53 and 54, each having a depth equal to the thickness of a plate material of the shutter member 41, are formed in a sliding region of the shutter member 41 inclusive of lateral side edges of the recording/reproducing apertures 39, 40 and the front side of the cartridge main body 34. By forming the slide recesses 52 to 54 in this manner, the shutter member 41 may be mounted flush with the surface of the cartridge main body 34 to prevent the cartridge main body 34 from being increased in thickness.

Meanwhile, since the lower half 33 has a variable thickness between the region thereof provided with the slide recess 53 and the remaining region, and since the recording/reproducing aperture 40 and the aperture 38 for the disc table are also provided, it becomes difficult to introduce the synthetic resin uniformly into a mold in case of injection molding in accordance with a one-point gate system.

Figure 12:
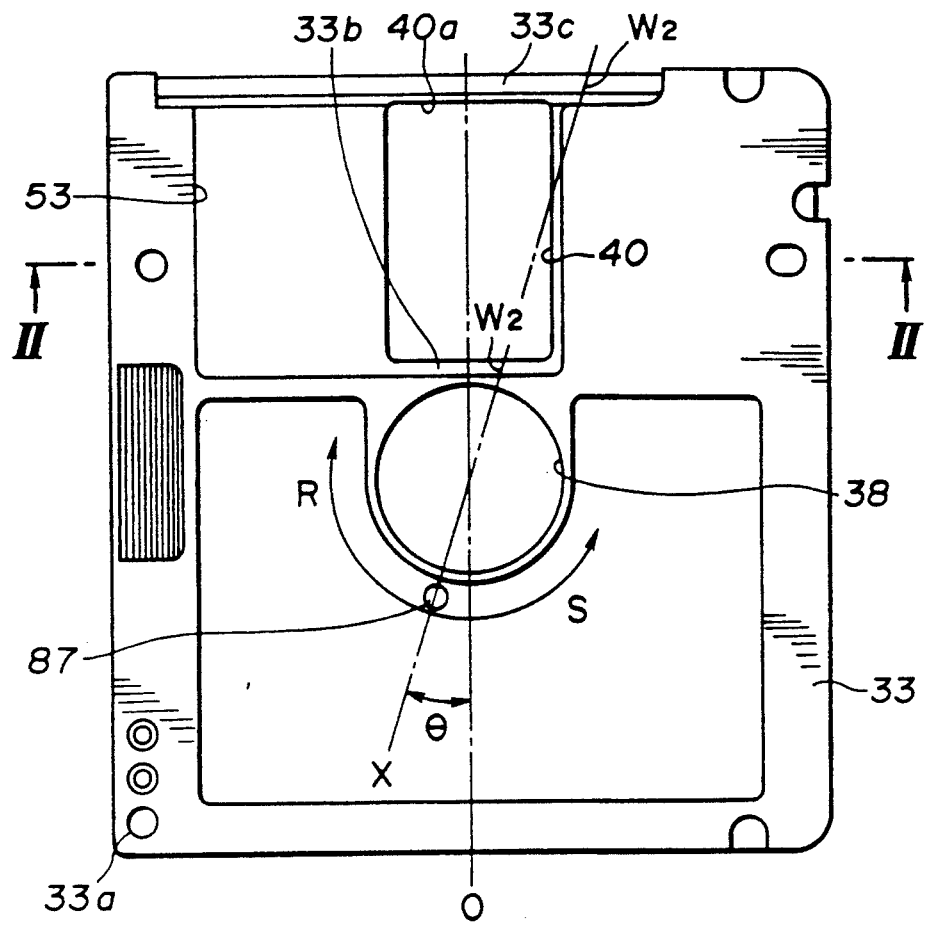
FIG. 12 is a plan view showing a lower half showing an arrangement of a gate for molding the lower half of the disc cartridge according to the present invention.

For injection molding the lower half 33 with a synthetic resin, a gate 87 for injection molding of synthetic resin is provided at a position which is offset towards the shutter slide recess 53 with respect to a centerline O of the lower half 33 interconnecting the center of the aperture 38 for the disc table and the center of the recording/reproducing aperture 40 as shown in FIG. 12 and which is proximate to the aperture 38 for the disc table.

That is, the gate 87 is provided at a mid part of the lower half 33 proximate to the aperture 38 for the disc table and offset towards the slide recess 53 of reduced thickness. In the present embodiment, the gate 87 is provided at a position offset about an angle $\theta$ of 15° towards the slide recess 53 with respect to the centerline O.

If molten synthetic resin is injected at the gate 87, arranged in this manner, into the inside of a metal mold for molding the lower half 33, the resin will flow into the mold as two fractional streams R, S flowing on both sides of the aperture 38.

Since the gate 87 is arranged at the position offset towards the slide recess 53 with respect to the centerline O passing through the front side of the lower half 33, the fractional streams R and S meet at a position of a connecting zone 33b between the aperture 38 and the recording/reproducing aperture 40, which position is offset from the centerline O, that is substantially coincident with a straight line X interconnecting the gate 38 and the center of the aperture 87, or which is free from the slide guide recess 53. A weld line $W_2$ is formed at a confluent position of the two fractional streams R, S.

Similarly, at the connecting zone 33c along the other side edge of the recording/reproducing aperture 40, the two fractional streams meet at a position offset from the centerline O, that is, at a position substantially coincident with a straight line X interconnecting the gate 38 and the center of the aperture 87, on the side of the lower half 33 free from the slide guide recess 53. A weld line $W_2$ is formed at a confluent position of the two fractional streams R, S.

By offsetting the position of the gate 87 in this manner, the weld line $W_2$ may be generated at a wider width portion of the connecting zone 33b offset from the centerline O of the lower half 33 which is the narrowest width portion of the connecting web 33b.

In otherwords, the position of generation of the weld line $W_2$ may be shifted away from the weakest point of the connecting zone 33b.

Figure 13:
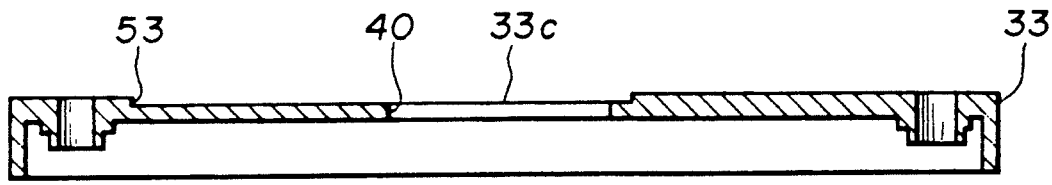
FIG. 13 is an enlarged cross-sectional view taken along line II—II of FIG. 12 showing a lower half of the disc cartridge shown in FIG. 12.

On the other hand, the gate 87 is offset towards the reduced thickness side of the lower half 33 where the slide recess 53 is formed as shown in FIG. 13 and hence a larger resistance is met. Thus the synthetic resin injected from the gate 87 and flowing on both sides of the aperture 38 may be injected uniformly without producing molding time difference between the zone of the slide recess 53 with reduced thickness and the remaining zone of increased thickness, so that the lower half 33 may be formed without producing molding distortions.

It is noted that, for not detecting from the appearance of the disc cartridge, the weld line $W_2$ is preferably formed within the extent of the connecting zone 33b which is covered by the shutter part 41b when the shutter member 41 is at a position of closing the recording/reproducing aperture 40.

Thus the mounting position of the gate 87 is selected to be offset towards the slide recess 53 with respect to the centerline O of the lower half 33 so that the weld line $W_2$ is produced at a position of the lower half 33 which is covered by the shutter part 41b of the shutter member 41.

Although the gate 87 is shown in the above embodiment at a position offset about 15° towards the centerline O, this mounting position of the gate is merely illustrative and may be arbitrarily selected so that the weld line $W_2$ is formed at a position of the connecting zone 33b offset towards the slide recess 53 so as to be covered by the shutter part 41b.

Within the cartridge main body 34, there is mounted a shutter locking member 47 for holding the shutter member 41 mounted on the cartridge main body 34 at a position of closing the recording/reproducing apertures 39 and 40.

Figure 14:
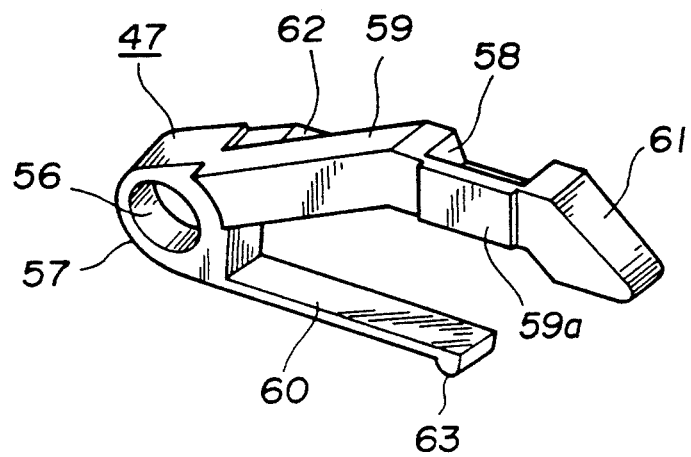
FIG. 14 is an enlarged perspective view of a shutter locking member of a shutter locking unit of the disc cartridge according to the first embodiment of the present invention, as viewed from a lateral side.
Figure 15:
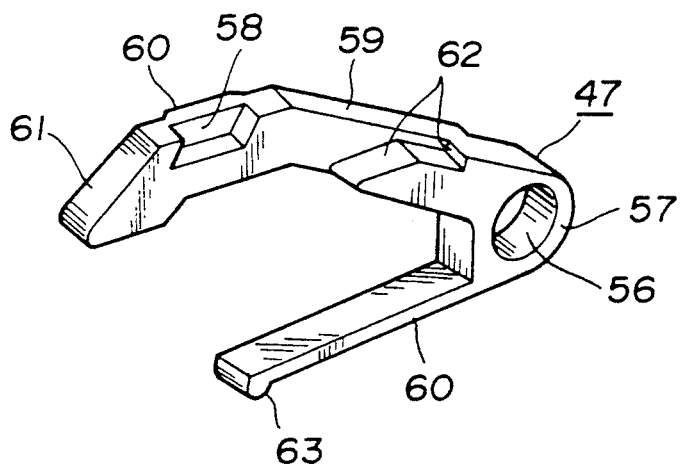
FIG. 15 is an enlarged perspective view of a shutter locking member of a shutter locking unit of the disc cartridge according to the first embodiment of the present invention, as viewed from the other lateral side.
Figure 16:
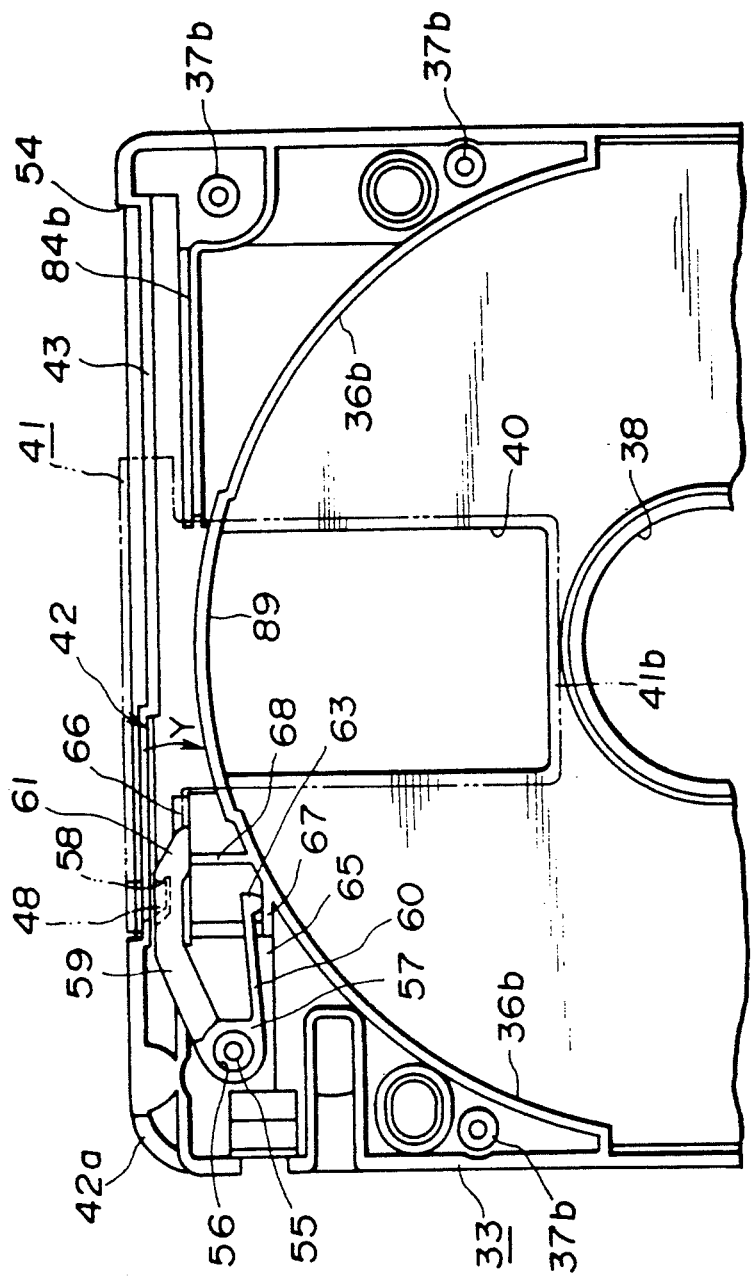
FIG. 16 is an enlarged partial plan view showing the state in which the shutter locking member shown in FIGS. 14 and 15 is arranged on the cartridge main body.

Referring to FIGS. 14, 15 and 16, the shutter locking member 47 is formed by molding synthetic resin, and includes a pivot 57 having a through-hole 56 for passage of an upright supporting shaft 55 mounted on the inner surface of the lower half 33, and a locking arm 59 extending from the pivot 57 and formed with a recess 58 for engagement with the engaging member 48 of the shutter member 41. The shutter locking member 47 also includes a resilient flexible tab 60 facing the locking arm 59 for being resiliently deformed when thrust from outside the cartridge.

The locking arm 59 of the shutter locking member 47 is substantially chevron-shaped and is formed at a bent part of the chevron shape with the engaging recess 58 engaged by the engaging member 48 of the shutter member 41. The engaging recess 58 is defined by a closure wall 59a and opened on the top and on the opposite lateral side, as shown in FIG. 15, in consideration that, if the engaging recess 58 should be formed as a notch extending through the entire thickness of the locking arm 59, the locking arm 59 would be deteriorated in mechanical strength.

The distal end of the locking arm 59 is formed with an inclined guide surface 61 for guiding the riding of the engaging member 48 of the shutter member 41 on the locking arm 59 as the engaging member 48 is about to be engaged with the engaging recess 58.

The proximal side of the locking arm 59 is formed with a step 62 by removing the material of the locking arm 59 from its distal end. The step 62 plays the role of being engaged with a mating wall formed on the inner surface of the lower half 33 for limiting the rotational movement of the shutter locking member 47.

The distal end of the resilient tab 60 is formed with an abutment bead 63.

Referring to FIGS. 9 and 16, the above-mentioned shutter locking member 47 is arranged in the cartridge main body 34 by having the upright supporting shaft 55 mounted on the inner surface of the lower half 33 passed through a through-hole 56. The upstanding supporting shaft 55, thus supporting the shutter locking member 47, is formed as one with the lower half 33, and is provided at a mounting zone 65 towards the corner of the front side of the cartridge main body 34 in which the groove 42 has the opening end 42a.

A rotation limiting wall 66 engaged by the rotation limiting step 62 of the locking arm 59 of the shutter locking member 47 is formed extending parallel to the slide guide wall 43 at the front side corner of the lower half 33 provided with the supporting shaft 55. A supporting lug 67 for supporting the abutment bead 63 at the distal end of the flexible tab 60 of the shutter locking member 47 is provided extending from the outer lateral side of the wall 36b of the disc housing section parallel to the wall 66 at the corner of the lower half 33 provided with the supporting shaft 55. A supporting projection 68 supporting the distal end of the locking arm 59 of the shutter locking member 47 is formed upright on the inner surface of the lower half 33.

Referring to FIG. 16, the shutter locking member 47 is placed at the mounting zone 65 within the lower half 33 by having the support shaft 55 passed through the through-hole 56 in the pivot 57, by engaging the step 57 of the locking arm 59 with the rotation limiting wall 66 and by having the abutment bead 63 at the distal end of the flexible tab 60 abutted and supported by the supporting lug 67. At this time, the distal end of the locking arm 59 is supported on the supporting projection 68.

With the shutter locking member 47 thus arranged in the mounting zone 65, the shutter locking member may be mounted in position within the cartridge main body 34 by having the locking arm 59 extended along the groove 42 formed on the front side of the cartridge main body 34, as shown in FIG. 16. The engaging member 48 of the shutter member 41, adapted for sliding along the front side of the cartridge main body 34, is ready to be engaged in the engaging recess 58 of the locking arm 59 which is faced by the groove 42.

As best seen in FIG. 9, the inner lateral surface of the upper half 32 is formed with a recess 59b for clearing the closure wall 59a of the locking arm 59 which, for closing the recess 58, is slightly expanded from the normal lateral side of the locking arm 59.

With the shutter locking member 47 thus arranged within the cartridge main body 34, when the shutter member 41 is moved to a position of closing the recording/reproducing apertures 39, 40, as shown in FIGS. 10 and 11, it is locked at this closure position, with the engaging member 48 engaged in the engaging recess 58, as shown in FIG. 16.

Figure 17:
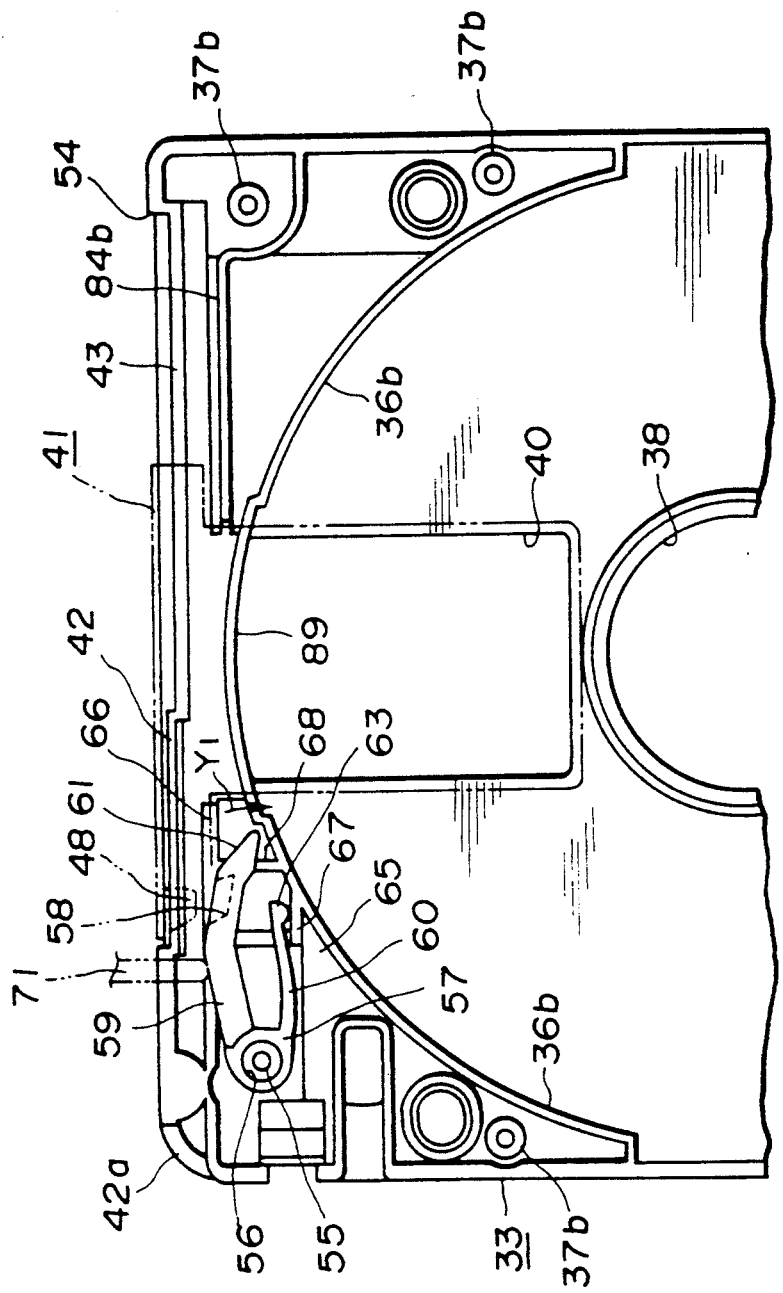
FIG. 17 is an enlarged partial plan view of the cartridge main body showing the state in which the shutter locking member shown in FIGS. 14 and 15 is rotated for unlocking the shutter member.
Figure 18:
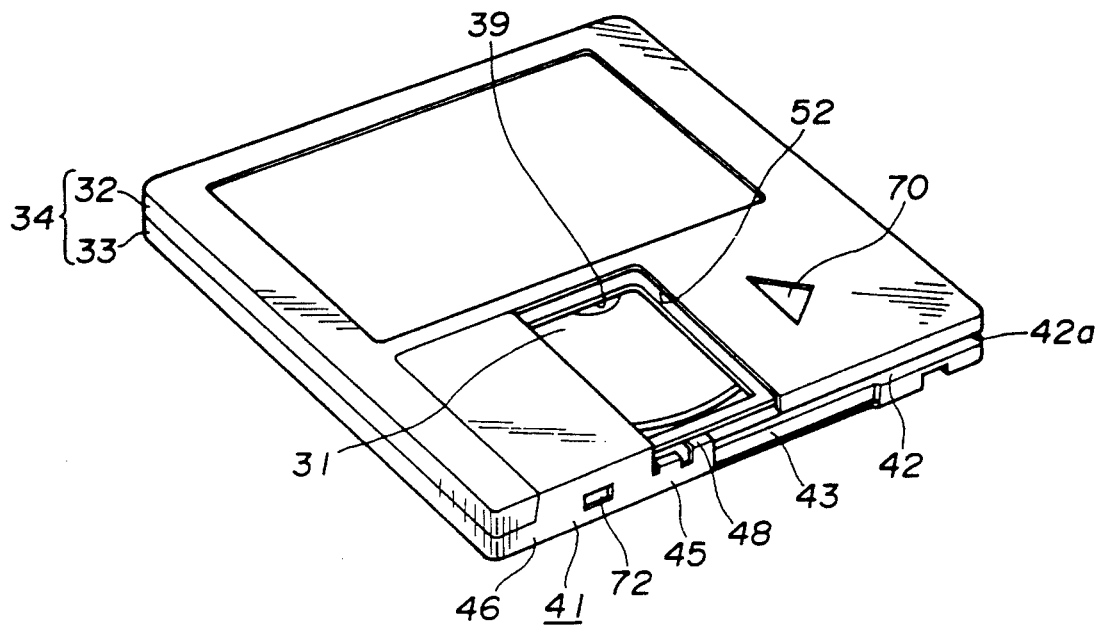
FIG. 18 is a perspective view, from the upper surface side, showing the state in which the shutter member is moved to a position of opening the aperture in the cartridge main body.

Referring now to FIGS. 17 and 18, if the disc cartridge provided with the shutter locking member 47 is introduced into the cartridge loading unit provided in the recording/reproducing apparatus and provided with a cartridge holder, with the direction indicated by an arrow X shown in FIG. 10 as an inserting direction, by following an indicating mark 70 provided on the upper surface of the cartridge main body 34, a shutter opening pin 71 provided in the recording/reproducing apparatus is introduced into the groove 42 formed on the front side of the cartridge main body 34. As the disc cartridge is further introduced into the disc loading device, the shutter opening pin 71 rides from the proximal side towards the distal side of the locking arm 59 of the shutter locking member 47 for thrusting the locking arm 59 towards the inner side of the cartridge holder 34 as indicated by arrow $Y_1$ in FIG. 17, with the pivot 57 supported by the supporting shaft 55 as a center of rotation, for resiliently flexing the tab 60 which has the abutment bead 63 abutted by the supporting lug 67. The shutter member 41 may now be moved freely because the engaging member 48 is now disengaged from the engaging recess 58.

Figure 19:
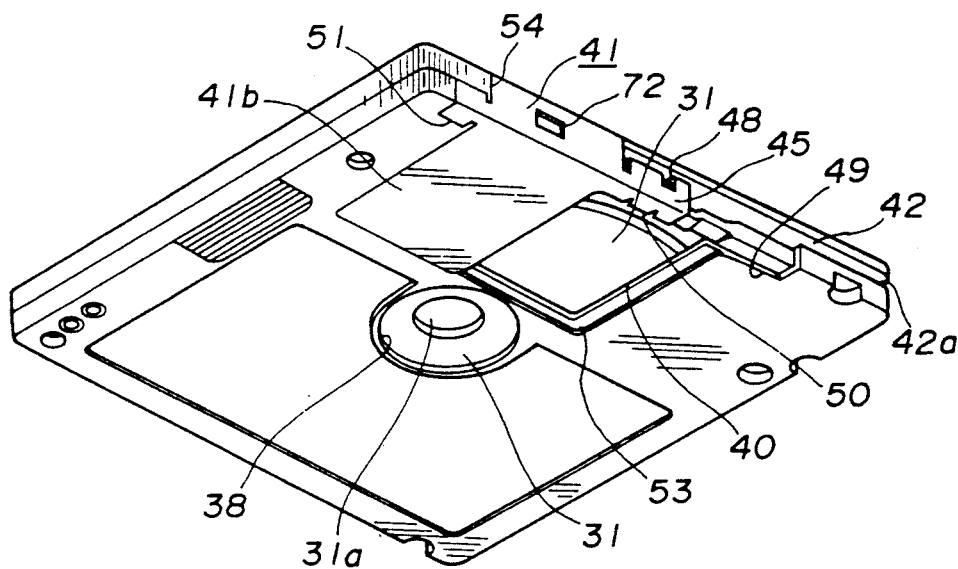
FIG. 19 is a perspective view, from the lower surface side, showing the state in which the shutter member is moved to a position of opening the aperture in the cartridge main body.

If, after the shutter member 41 is set free, the disc cartridge is introduced further into the inside of the cartridge loading section, the shutter member 41 is thrust by the shutter opening pin 71 and thereby slid towards the opening position as indicated by an arrow O in FIGS. 10 and 11 for opening the recording/reproducing apertures 39, 50 of the cartridge main body 34, as shown in FIGS. 18 and 19.

Figure 20:
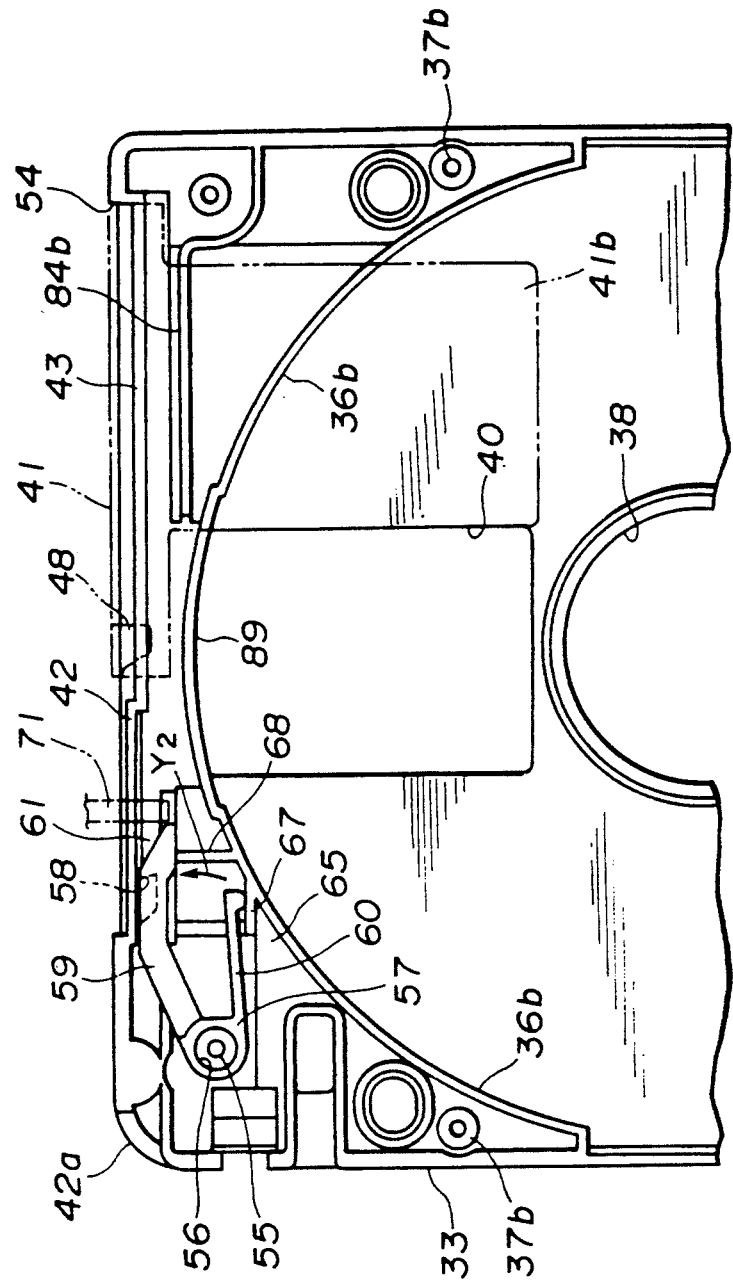
FIG. 20 is an enlarged partial plan view of the cartridge main body showing the shutter locking member in a state in which the shutter member is moved to a position of opening the aperture in the cartridge main body.

When the shutter member 41 is slid as far as the position of opening the apertures, the shutter opening pin 71 ceases to thrust the locking arm 59, so that the flexible tab 60, so far deflected resiliently, is reset for rotationally restoring the locking arm 59 in the direction shown by arrow $Y_2$ in FIG. 20, with the pivot 57 as the center of rotation, so that the groove 42 is faced by the engaging recess 58.

As best seen in FIGS. 18 and 19, with the present disc cartridge, an opening 72 engaged by a shutter closing pin (not shown) provided in the recording/reproducing apparatus when the disc cartridge is loaded in the cartridge loading section within the recording/reproducing apparatus, with the recording/reproducing apertures 39 and 40 being opened. The opening 72 is formed at the mid position of the connecting web 41c of the shutter member 41. When the disc cartridge, loaded in the cartridge loading unit with the shutter closing pin engaged in the opening 72, is displaced, the shutter member 41 is moved with respect to the cartridge main body 34 in the direction of closing the apertures 39 and 40, that is in the direction indicated by arrows O in FIGS. 10 and 11. When the shutter member 41 is displaced in this manner, the flexible tab 60 is first deflected resiliently, after which the engaging member 48 rides on inclined guide surface 61 at the distal end of the locking arm 59 of the shutter locking member 47 which has been rotated and reset in the direction of arrow $Y_2$ as shown in FIG. 20. If the disc cartridge is further extracted outwardly of the cartridge loading section, the engaging member 48 is engaged with the engaging recess 58 of the shutter locking member 57, as shown in FIG. 16, for locking the shutter member 41 at the position of closing the apertures 39 and 40, as shown in FIGS. 10 and 11.

Figure 21:
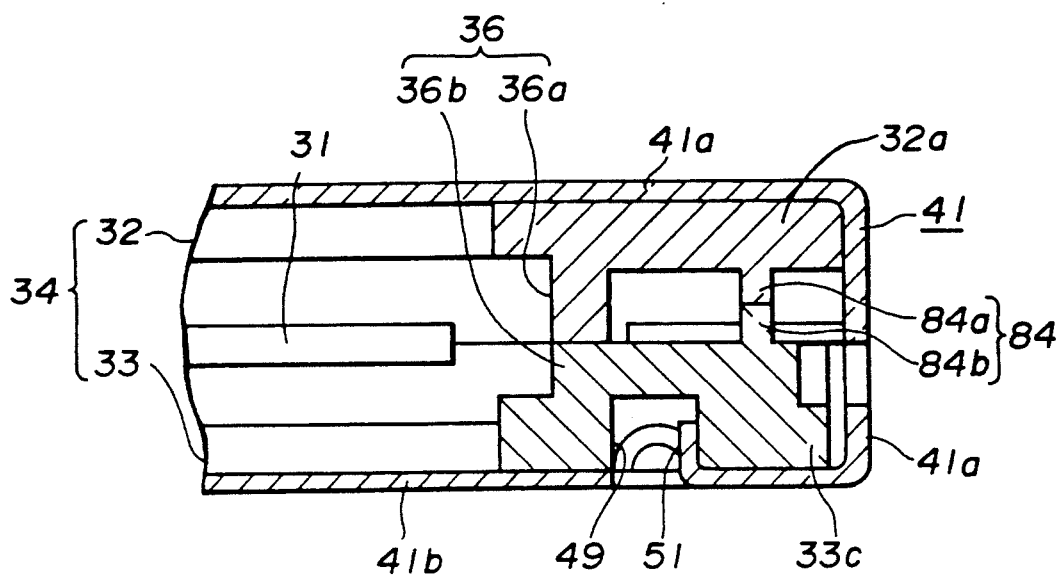
FIG. 21 is an enlarged partial cross-sectional view showing the front end face of the disc cartridge according to the first embodiment of the present invention.

With the present disc cartridge, an abutment rib 84, comprised of the half ribs 84a, 84b, is provided for bridging the upper half 32 and the lower half 33, as shown in FIGS. 9 and 21, within the inside of the cartridge main body 34 between the front side of the cartridge main body 34 along which slides the shutter member 41 and an abutment zone 88 as a top surface of the portion of the arcuate disc housing position controlling wall section 36 facing the front side of the cartridge main body 34.

The abutment rib 84 is formed by abutting half ribs 84a, 84b upstanding from the inner lateral surfaces of the upper and lower halves 32 and 33.

Specifically, the abutment rib 84 bridging the upper and lower halves 32, 33 is formed parallel to the front side of the cartridge main body 34 at reduced thickness portions of the upper and lower halves at the slide guide recesses 52 and 53.

Although the abutment rib 84 is formed by abutting the upstanding half ribs 84a, 84b formed on the inner lateral surfaces of the upper and lower halves 32, 33, it may also be formed as a single rib extended from one to the other of the upper and lower halves 32, 33.

The abutment rib 84 plays the part of reinforcing the front sides 32a, 33a of the upper and lower halves 32, 33 of the cartridge main body 34 which are opened by providing the groove 42. Since the abutment rib 84 is provided for bridging the upper and the lower halves 32, 33, the opened front side of the cartridge main body 34 is thereby closed.

On the other hand, since the abutment rib 84 is provided slightly inwardly of the front side of the cartridge main body 34, moderate flexibility may be donated to the front side of the cartridge main body 34 of synthetic resin formed with the groove 42 for assuring a facilitated mounting operation of the shutter member 41.

Figure 22:
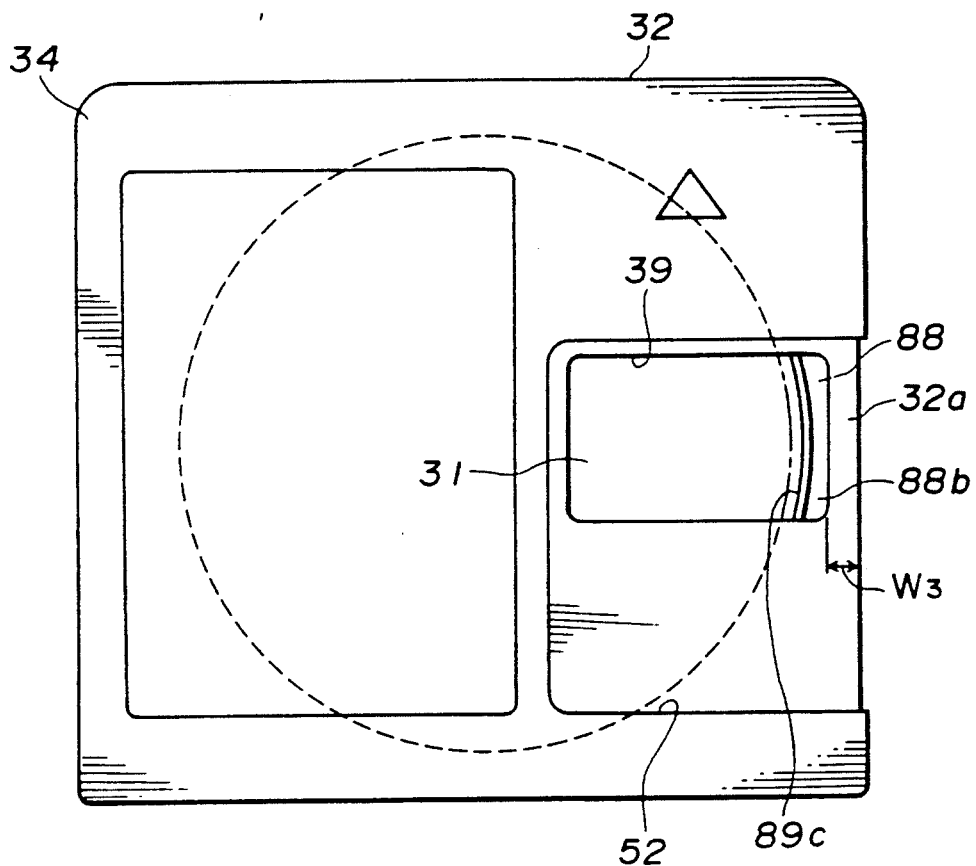
FIG. 22 is a plan view, from the upper surface side, showing the disc cartridge according to the first embodiment of the present invention.
Figure 23:
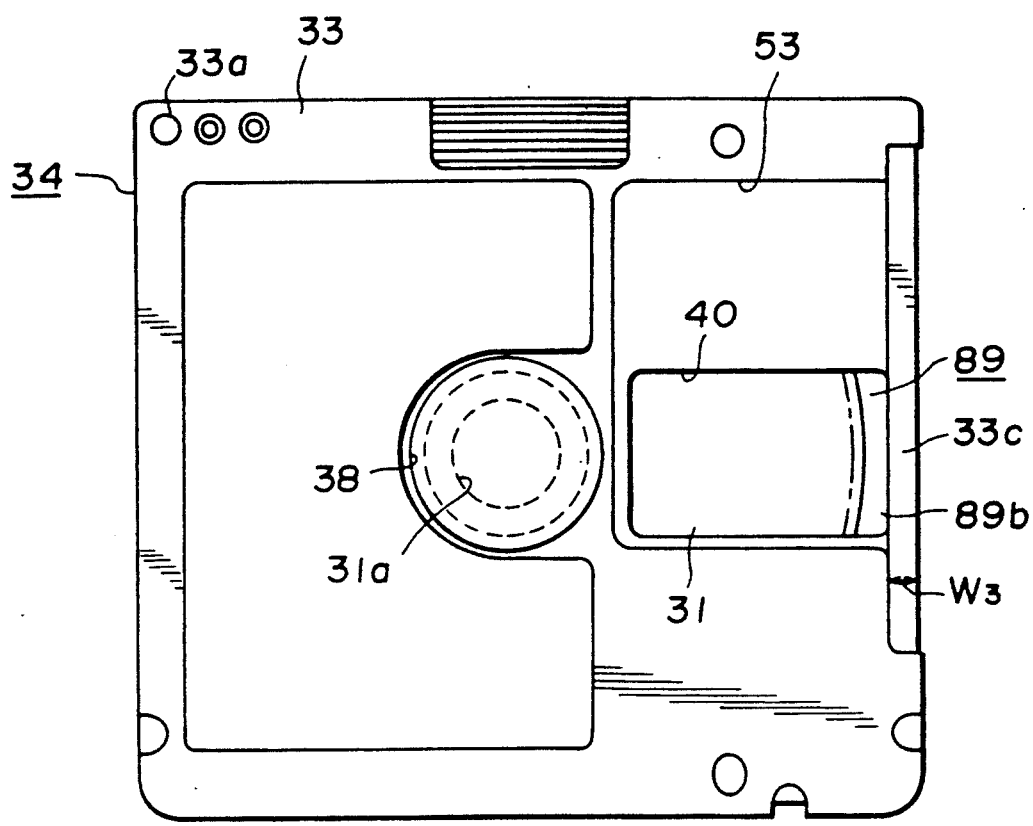
FIG. 23 is a plan view, from the lower surface side, showing the disc cartridge according to the first embodiment of the present invention.

With the disc cartridge of the present invention, besides the abutment rib 84 reinforcing the front side of the cartridge main body 34, abutment projections 88, 89 are formed, as shown in FIGS. 22 and 23 on the side edges of the connecting zones 32a, 33c neighboring to the apertures 39 and 40 which are reduced in width as result of formation of the apertures 39 and 40, so that these projections 88, 89 may be abutted to each other when the upper and the lower halves are abutted to each other for forming the cartridge main body 34.

Figure 24:
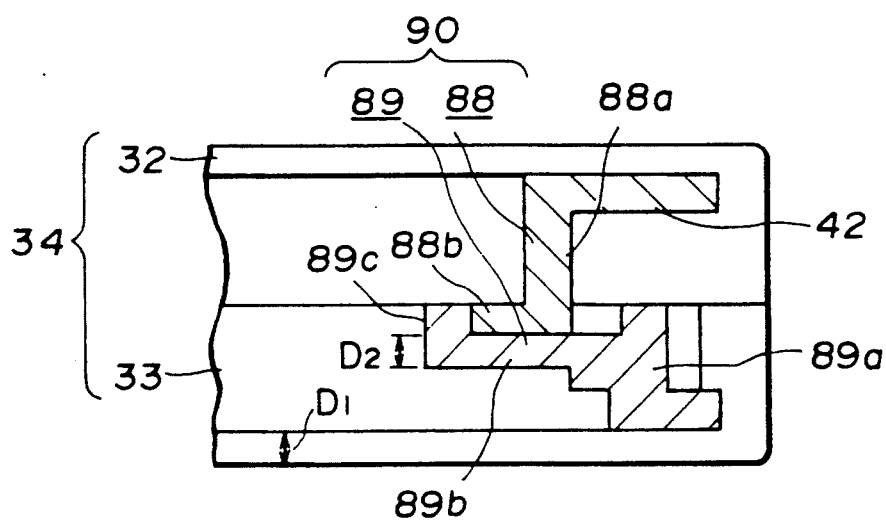
FIG. 24 is an enlarged partial cross-sectional view of the front end face side showing the disc cartridge according to the first embodiment of the present invention.

Referring to FIG. 24, these abutment projections 88, 89 are made up of upstanding sections 88a, 89a formed on the inner lateral sides of the upper and the lower halves 32, 33, respectively, and abutment surface sections 88b, 89b horizontally extended from the upstanding sections 88a, 89a, respectively, towards the inside of the recording/reproducing apertures 39, 40. These abutment surface sections 88a, 89a play the role of increasing the abutment area between the projections 88, 89.

Referring to FIGS. 22 and 23, the distal ends of the abutment surface sections 88b, 89b are arcuate in profile to conform to the outer periphery of the magneto-optical disc 31 accommodated in the cartridge main body 34.

The distal end of the abutment surface section 89a of the abutment projection 89 of the lower half 33 is formed with an abutment controlling portion 89c of substantially the same height as the thickness of the abutment surface section 88b of the abutment projection 88 of the upper half 32.

The abutment controlling section 89c is arranged to be arcuate in profile to form a part of the arc of a circle continuous to the abutment controlling wall section 36b constituting the disc housing position controlling wall 6, as shown in FIG. 9.

It is noted that, since the abutment projections 88, 89 are made up of upstanding parts 88a, 89a for assuring abutment height and abutment surface sections 88b, 89b extended horizontally from these upstanding sections 88a, 89a, these abutment projections 88, 89 may be of a thickness $D_2$ which is approximately equal to the thickness $D_1$ of the major surface of the upper or lower halves 32, 33. For this reason, if the abutment projections 88, 89 are formed with the abutment surface sections 88b, 89b for increasing the abutment area, it becomes possible to avoid the formation of thickened portions due to the provision of these abutment projections. The result is that molding distortions otherwise caused by the provision of the abutment projections 88, 89 may be prevented when molding the upper and the lower halves 32, 33 from synthetic resin.

When the upper and the lower halves 32, 33 are abutted and connected to each other to form the cartridge main body 34, the abutment projections 88, 89 provided on the upper and the lower halves 32, 33 are abutted to each other, as shown in FIG. 24, with the abutment surface sections 88b, 89b abutting against each other and with the abutment controlling portion 89c controlling the abutment position of the abutment surface section 88b of the abutment projection 88 of the upper half 32. The abutment projections 88, 89, thus abutted to each other, provide a reinforcement 90 for reinforcing the connecting zones 32a, 33c of reduced thickness neighboring to the recording/reproducing apertures 39, 40, while providing a bottom of the groove 42.

Besides, when the abutment projections 88, 89 are abutted to each other, since the distal end of the abutment surface section 88b of the abutment projection 88 of the upper half 32 is controlled by the abutment controlling portion 89c, it becomes possible to control abutment position deviations between the projections 88, 89 positively to prevent distortion or deformation of the cartridge main body more reliably.

By providing the above-described abutment projections 88, 89, it becomes possible to assure rigidity of the connecting zones 32a, 33c which are reduced in thickness and hence in rigidity due to provision of the apertures 39, 40 to render it possible to maintain sufficient strength of the cartridge main body 34. Above all, a sufficient strength may be assured of the front side of the cartridge main body 34 which may be easily flexed and deformed due to provision of the groove 42. Since the strength of the front side of the cartridge main body 34 is assured, the shutter member 41 fitted to this front side may be held positively with respect to the cartridge main body 34.

Figure 25:
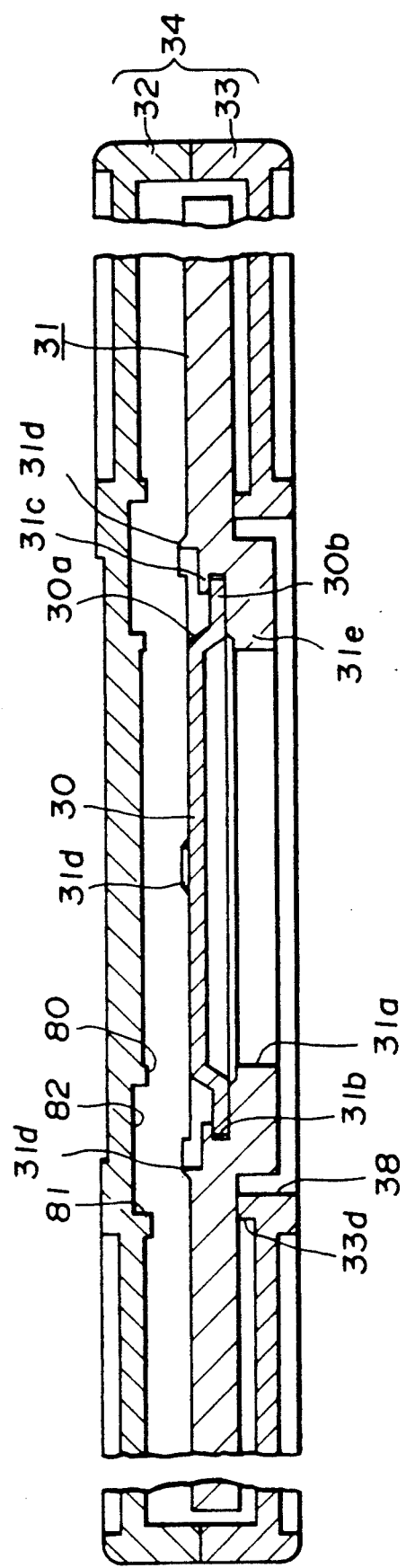
FIG. 25 is an enlarged cross-sectional view showing the disc cartridge according to the first embodiment of the present invention.

With the disc cartridge of the present invention, there is provided a plate support 80 for receiving the metal plate 30 attached to the magneto-optical disc 31 housed within the cartridge main body 34. Referring to FIG. 25, the plate support 80 is formed on the inner surface of the upper half 32 for facing the metal plate 30 attached to the magneto-optical disc 31 which is housed within the disc housing section so as to be controlled as to the radial movement, and is in the form of a ring which is slightly smaller in diameter than the disc-shaped metal plate 30.

Referring to FIG. 25, the plate support 80 is projected to a height which is equal to or slightly smaller than the height of a disc support boss 81 formed on the inner surface of the upper half 32. When a force for lifting up the magneto-optical disc 31 is applied through the aperture 38 for the disc table, the plate support 80 supports the metal plate 30 substantially at the same time that the disc support boss supports the disc substrate. Thus, when the metal plate 30 is mounted substantially flush with the major surface of the disc substrate, as in the case of the present magneto-optical disc 31, the plate support 80 is provided on the inner surface of the upper half 32 with a height approximately equal to that of the disc support boss 81 or, alternatively, with a height slightly smaller than that of the disc support boss 81, in consideration of the mounting tolerance of the metal plate 30.

With the disc cartridge of the present invention, the inner surface of the upper half 32 of the cartridge main body 34 is formed with a clearance 82 for clearing a protuberance 31d of the magneto-optical disc 31 accommodated in the cartridge main body 34. The clearance 82 is provided at a position in register with the protuberance 31d of the magneto-optical disc 31 accommodated in the disc housing section of the cartridge main body 34 so as to be restricted in radial movement, and is formed as a ring between the disc support boss 81 and the plate support 80. The clearance 82 is formed as a recessed groove formed by reducing the thickness of the portion of the upper half 32 which is delimited between the disc support boss 81 and the plate support 80.

Figure 26:
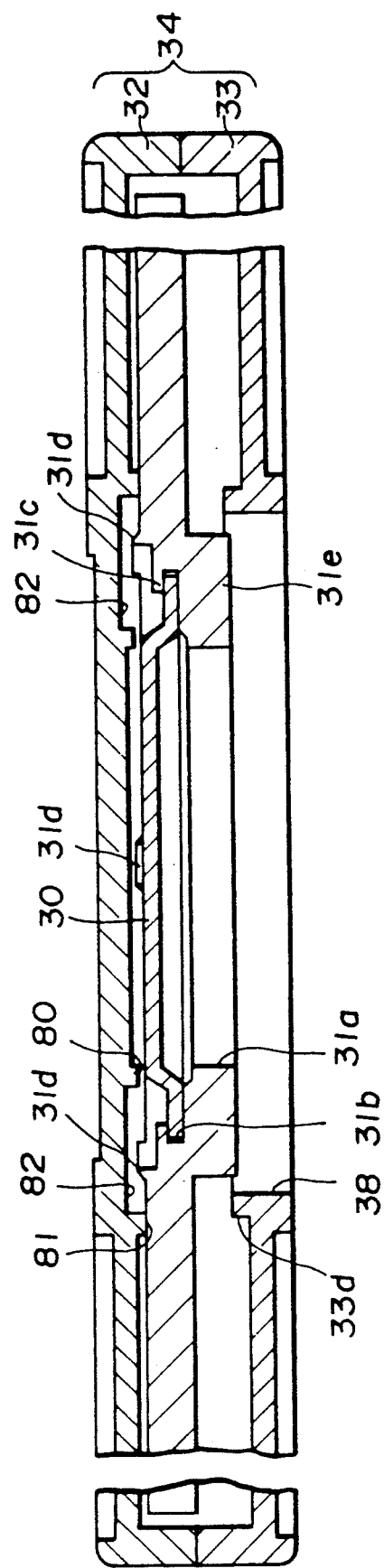
FIG. 26 is an enlarged cross-sectional view showing the state in which the magneto-optical disc of the first embodiment of the present invention is raised towards the upper half.

The clearance 82 is of a depth large enough to prevent the protuberance 31d projected on one major surface of the disc substrate of the optical disc 31 from being contacted with the upper half 32 when the magneto-optical disc 31 is uplifted towards the upper half 32 within the cartridge main body 32 so as to be supported by the disc support boss 81 as shown in FIG. 26. Thus the depth of the clearance 82 is selected in consideration of the height of the protuberance 31d which results from attachment of the metal plate 30 on one major surface of the disc substrate of the optical disc 31.

However, the depth of the clearance is so set that the upper half 32 is not reduced in thickness excessively such that mechanical strength of the upper half can not be assured.

A disc cartridge according to a second embodiment of the present invention will be explained by referring to FIGS. 27 ff. Those parts or components which are common to those of the preceding embodiments are designated by the same reference numerals and the detailed description is omitted for simplicity.

With the disc cartridge of the present second embodiment, a plate support 91 is additionally provided for receiving the metal plate 30 mounted on the magneto-optical disc 31 accommodated in the cartridge main body 34. This plate support 91 is provided on the inner surface of the upper half 32 for facing the metal plate 30 attached to the magneto-optical disc 31 accommodated in the disc housing section 93 so as to be controlled in radial movement, and is formed as a ring of a diameter slightly smaller than the diameter of the disc-shaped metal plate 30.

Figure 27:
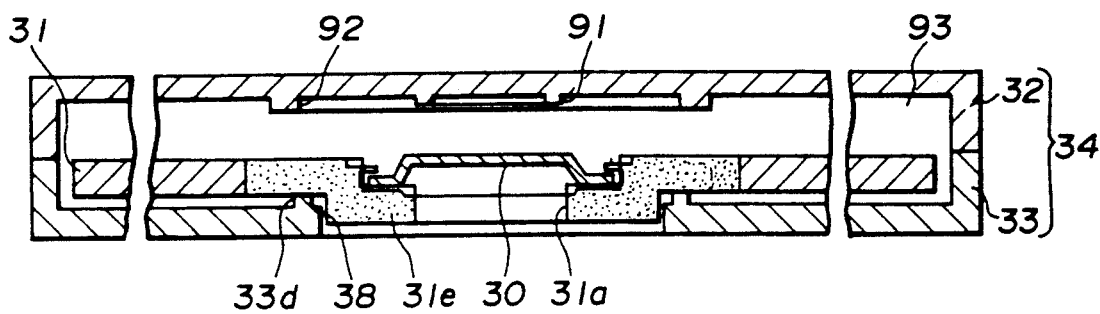
FIG. 27 is an enlarged cross-sectional view showing the disc cartridge according to the second embodiment of the present invention.
Figure 28:
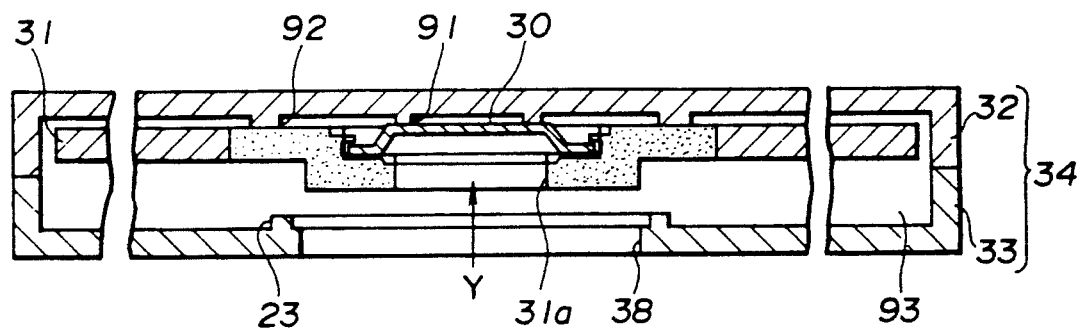
FIG. 28 is an enlarged cross-sectional view showing the state in which the magneto-optical disc of the second embodiment of the present invention is raised towards the upper half.
Figure 29:
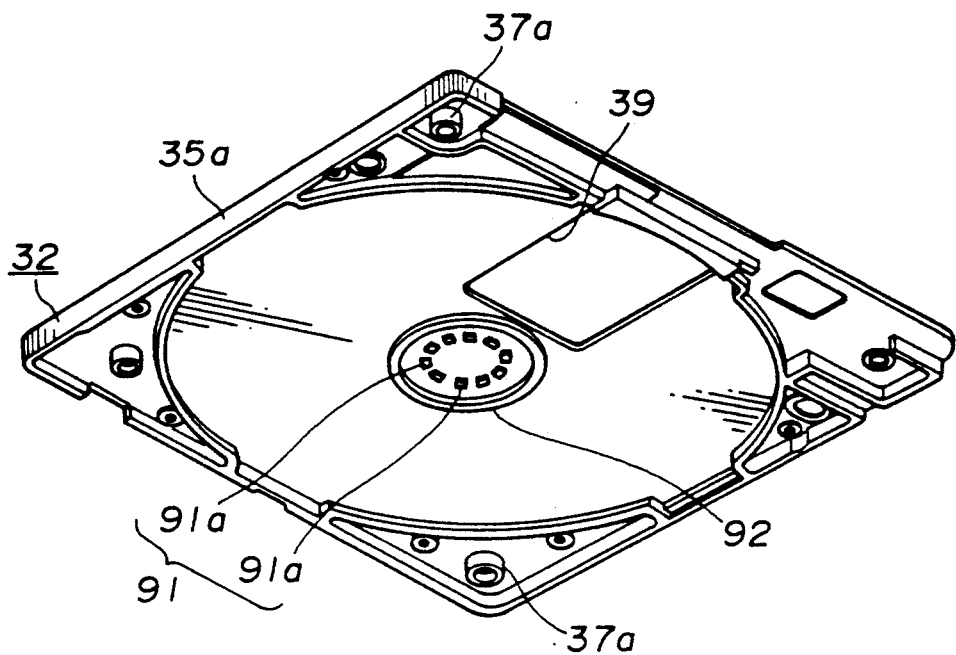
FIGS. 29 to 33 are perspective views showing modifications of the plate support of the disc cartridge of the second embodiment of the present invention.

Referring to FIG. 27, the plate support 91 has a height approximately equal to or slightly lower than the disc support boss 92 on the inner surface of the upper half 32. That is, as shown in FIG. 28, the plate support 91 is so arranged that when an uplifting load is applied to the magneto-optical disc 31 by means of the aperture 38 for the disc table, the plate support 91 is able to support the metal plate 30 at substantially the same time that the disc support boss 92 supports the disc substrate. Thus, when the metal plate 30 is mounted substantially flush with the major surface of the disc substrate, as in the case of the present magneto-optical disc 31, the plate support 91 is provided on the inner surface of the upper half 32 with a height approximately equal to that of the disc support boss 92 or, alternatively, with a height slightly smaller than that of the disc support boss 92, in consideration of the mounting tolerance of the metal plate 30.

By providing the plate support 91 as described above, when the metal plate 30 is thrust by means of the center aperture 31a faced by the aperture 38 for the disc table for uplifting the magneto-optical disc 31 in the direction shown by arrow Y in FIG. 28, the metal plate 30 is also supported by the plate support 91 at the same time that the disc substrate of the magneto-optical disc 31 is supported by the disc support boss 92, or the metal plate is brought to close proximity to the plate support 91. Since there is produced no wide gap between the metal plate 30 and the inner surface of the upper half 32 in this manner, it becomes possible to prevent a larger load from being applied only to the metal plate 30 and hence to prevent the metal plate 30 from being peeled or detached rom the disc substrate of the magneto-optical disc 31.

Although the plate support 91 is formed as a continuous ring in the above-described embodiment, it may also be formed by a series of minute projections 91a arranged in a ring of a slightly smaller diameter than that of the metal plate 30.

Figure 30:
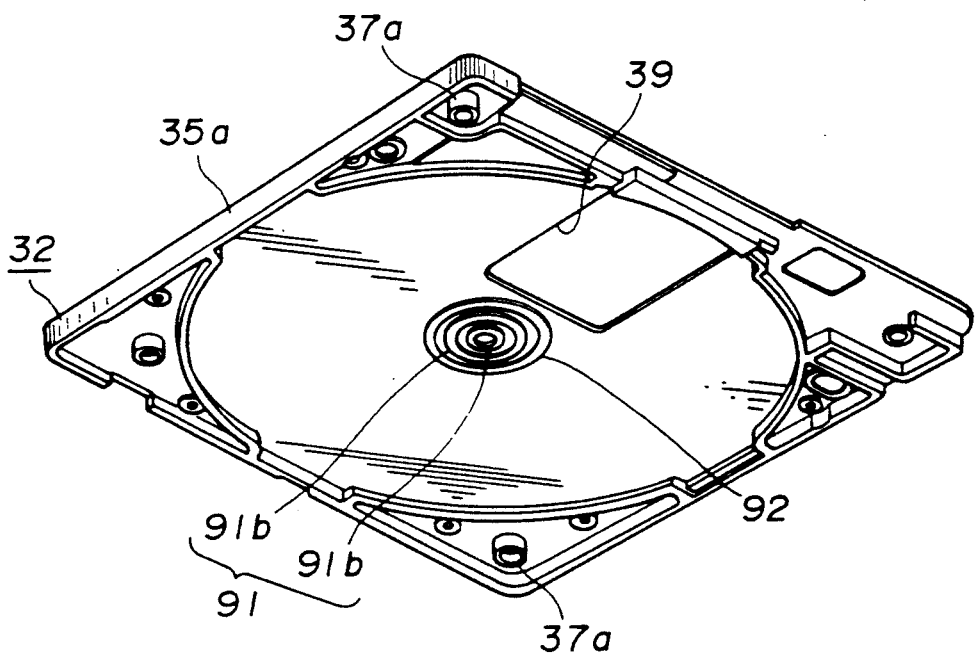

The plate support 91 may also be formed by an annular ring-shaped projection 91b supporting the outer perimeter of the metal plate 30 and an annular ring-shaped projection 91b supporting the inner periphery of the metal plate 30, as shown in FIG. 30.

Figure 31:
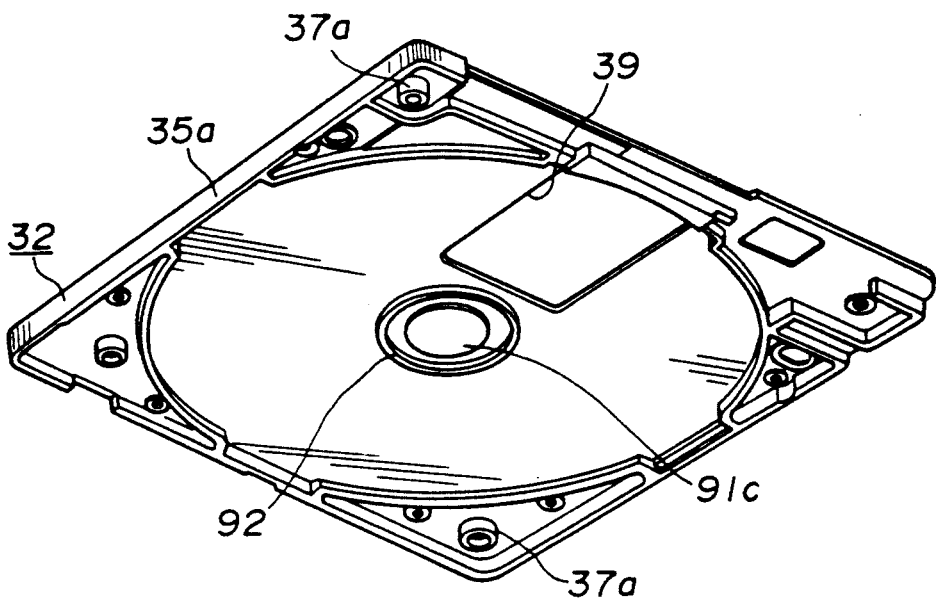

The plate support 91c may also be formed as a circular projection substantially corresponding to the outside diameter of the metal plate 30, as shown in FIG. 31.

Figure 32:
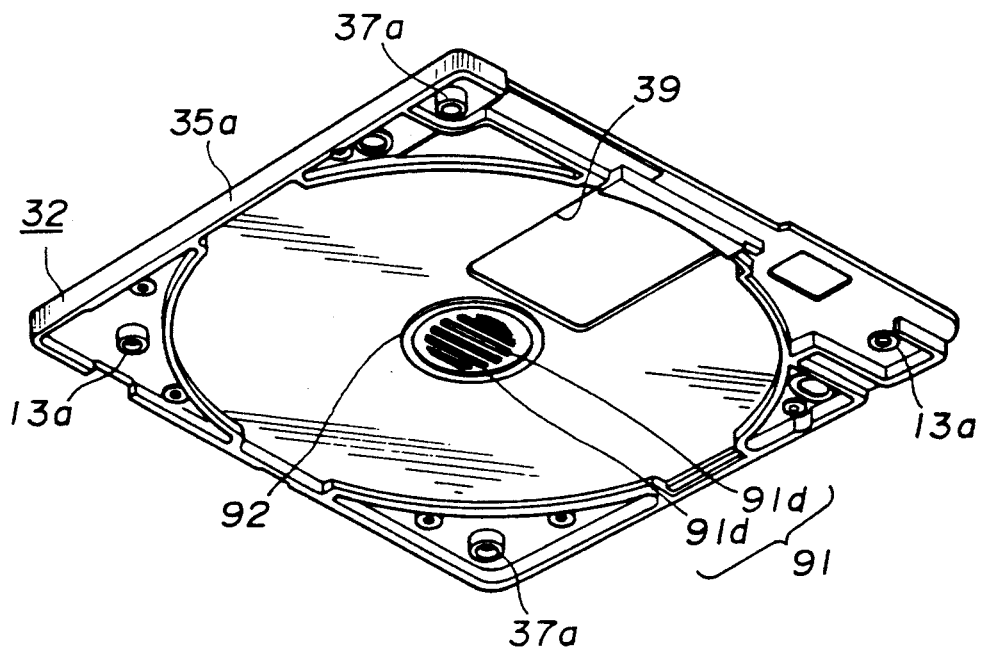

The plate support 91 may also be formed by a series of parallel ribs 91d arranged within the extent of a circle corresponding to the metal plate 30, as shown in FIG. 32.

Figure 33:
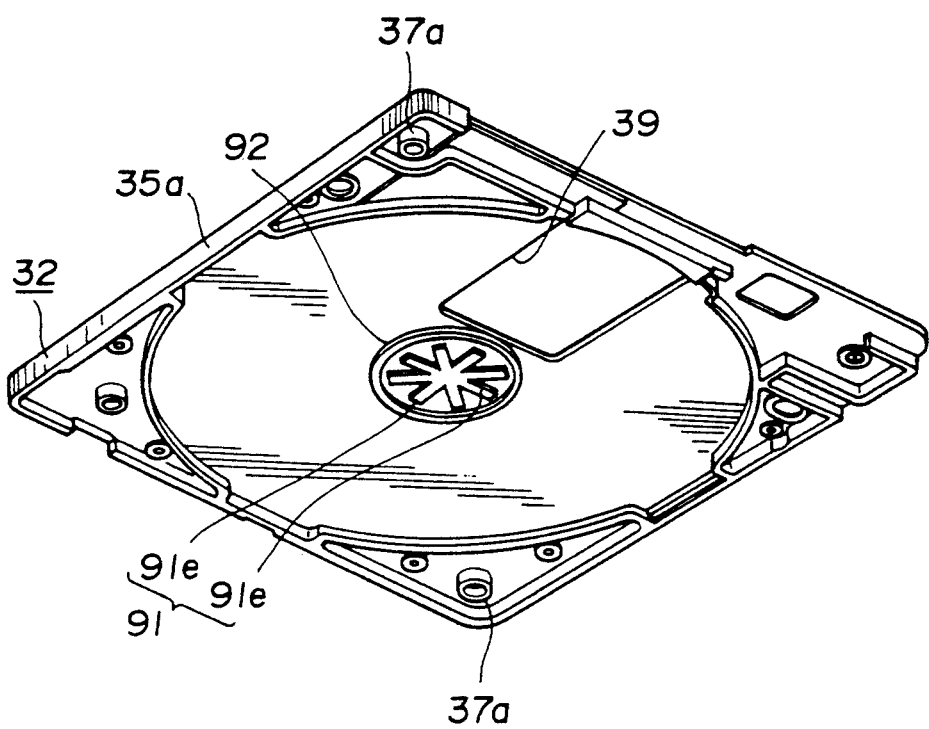

The plate support 91 may also be formed by plural ribs 91e radially extended from the position of the plate support corresponding to the center of the metal plate 30, as shown in FIG. 33.

In sum, the plate support 91 may be of any desired shape if it is capable of supporting the metal plate 30 at the same time that the disc support boss 92 supports the disc substrate of the magneto-optical disc 31 when the metal plate 30 is thrust to uplift the magneto-optical disc 31 towards the upper half 32.

Figure 34:
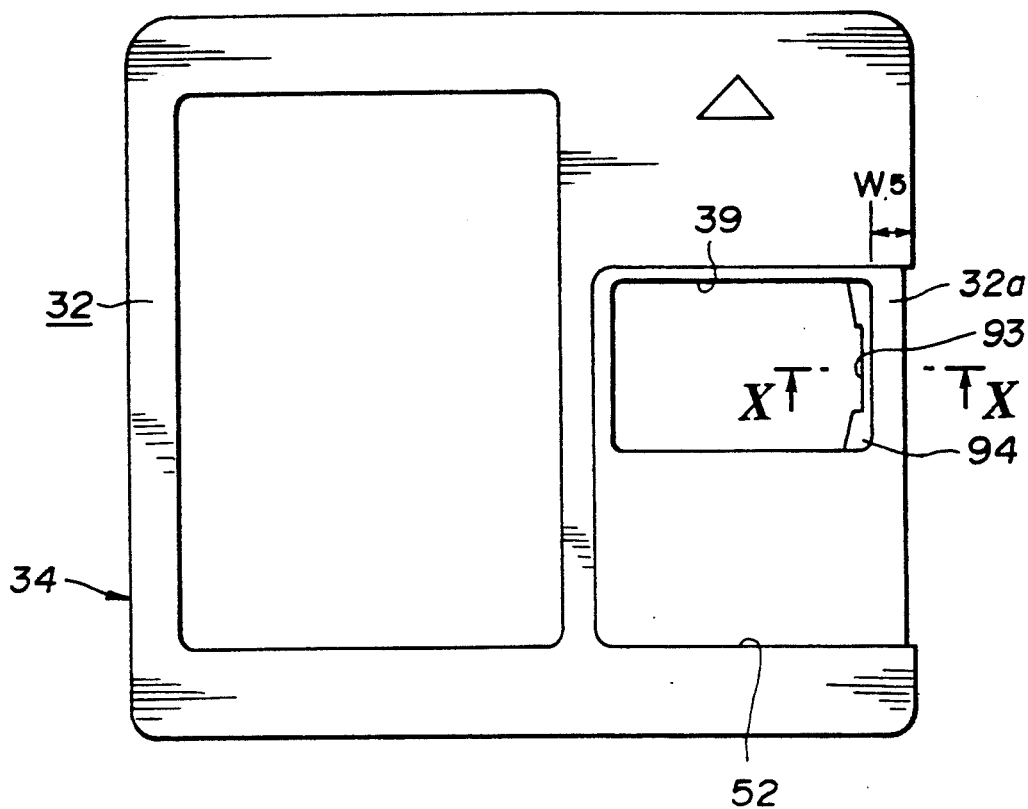
FIG. 34 is a plan view of a disc cartridge of a third embodiment of the present invention.

A third embodiment of the present invention will be hereinafter explained in reference to FIGS. 34 and 35. It is noted that parts or components corresponding to those of the preceding embodiments are denoted by the same reference numerals and the corresponding description is omitted for simplicity.

Figure 35:
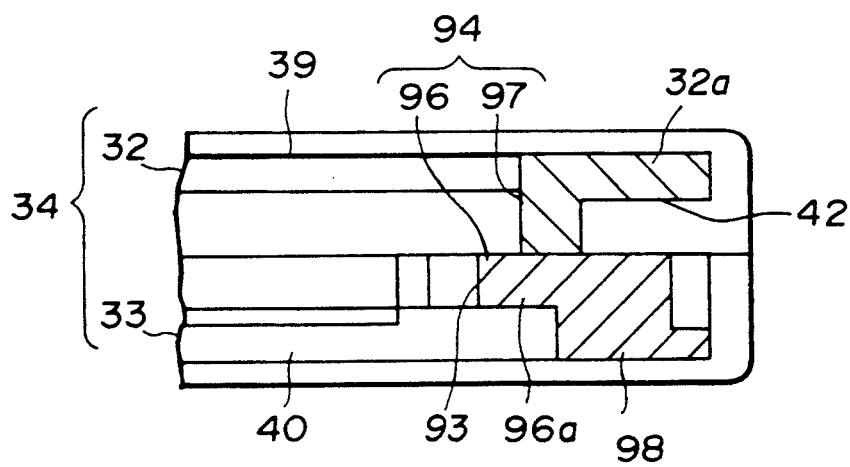
FIG. 35 is an enlarged cross-sectional view of the disc cartridge, taken along line X—X in FIG. 34.

In the present third embodiment of the disc cartridge, an abutment projection 97 and an abutment support 96 making up a reinforcement 94 are abutted and connected to each other at the position corresponding to the connecting zones 32a, 98 neighboring to the apertures of the upper half 32 and the lower half 33, as shown in FIG. 35, for reinforcing the narrow width connecting zones 32a, 98 and for providing the bottom of the groove 42. The abutment support 96 is formed with an abutment support extension 96a projected inwardly of the recording/reproducing apertures 39, 40 for providing a width wider than the width of the connecting zone 98 for assuring a sufficient strength of the connecting zones 32a, 98 of a narrow width as shown at $W_5$ in FIG. 34 and a weak strength when the abutment projection 97 is abutted to form the reinforcement 94. The end face of the abutment support extension 96a is formed as an arc of a circle corresponding to the outer periphery of the magneto-optical disc 31.

Figure 36:
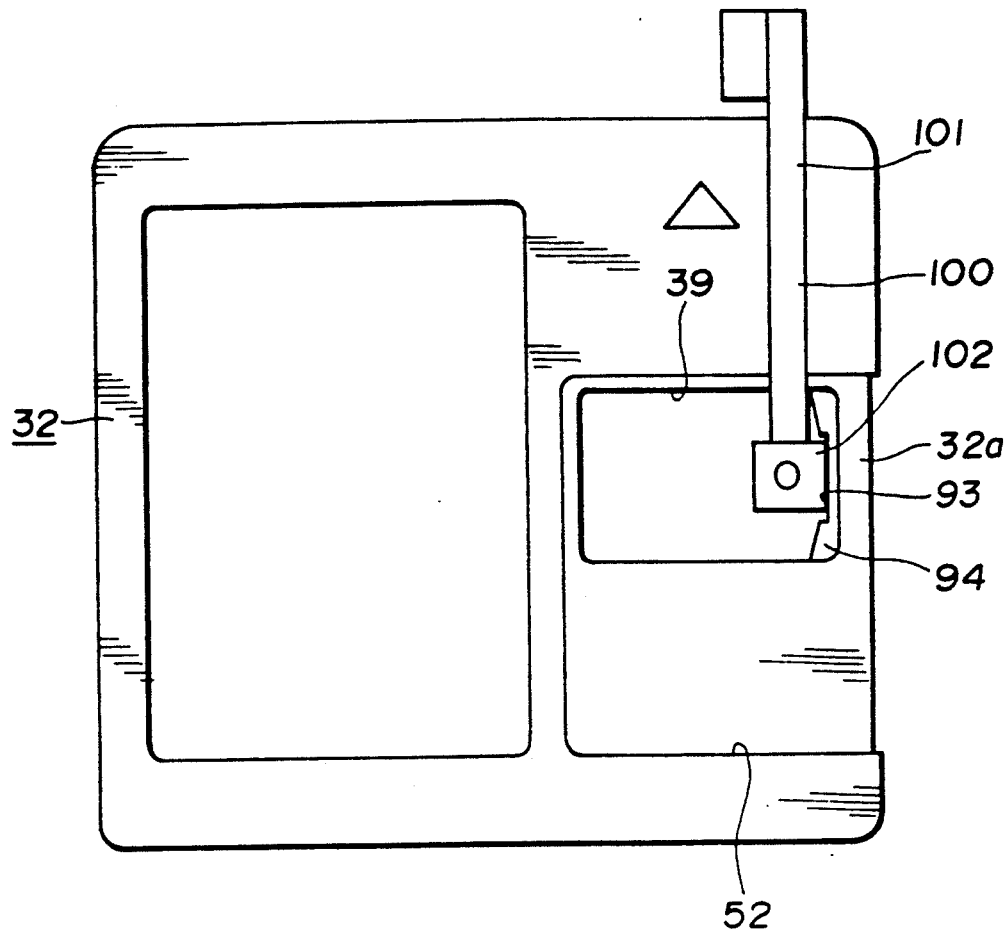
FIG. 36 is a plan view showing the state in which a coil for generating an external magnetic field reaches the outer most part of the magneto-optical disc accommodated in the disc cartridge according to the third embodiment of the present invention.

As best seen in FIG. 36, with the disc cartridge of the present third embodiment the abutment support extension 96a at the distal end of the abutment support 96 projected into the connecting zone 98 of the aperture is formed with a notch 95 to permit intrusion of a magnetic field generating coil 102 attached to the end of a movement support arm 101 constituting an external magnetic field generator 100 for acting on the signal recording region of the magneto-optical disc 31. This notch 93 is formed at the center in the front side of the cartridge main body 34.

By abutting the abutment projection 97 and the abutment support 96 to form the reinforcement 94, a sufficient strength may be assured at the front side of the cartridge main body 34 which is reduced in width by the formation of the recording/reproducing apertures 39, 40 and lowered in strength by providing the groove 42.

When the disc cartridge according to the third embodiment of the present invention is loaded in the recording/reproducing apparatus for recording information signals, such as musical sound signals, an optical pickup, not shown, and the coil 102 of the external magnetic field generating device 100, are faced by the major surfaces of the magneto-optical disc 31 through the recording/reproducing apertures 39, 40, respectively.

The optical pickup and the coil 102 of the external magnetic field generating device 100 scan the signal recording region of the magneto-optical disc 31 in synchronism across the inner and the outer disc peripheries for recording desired information signals.

Figure 37:
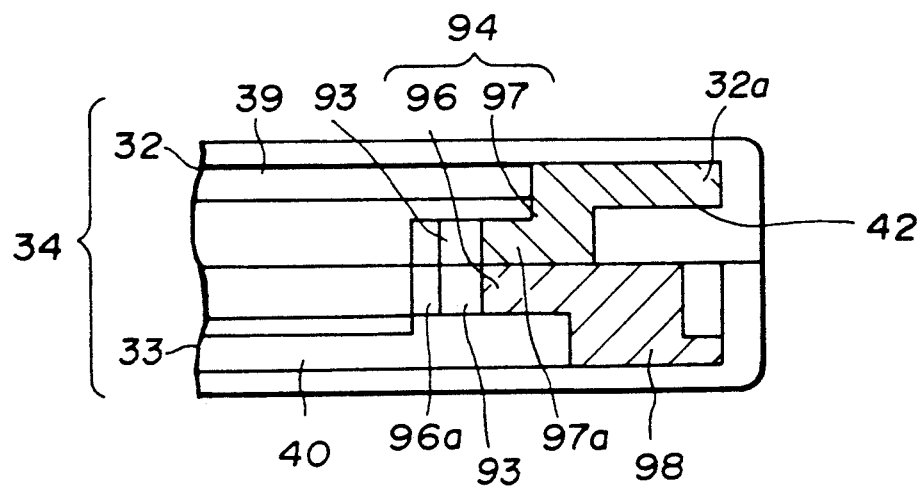
FIG. 37 is an enlarged cross-sectional view showing a modification of a reinforcement of the disc cartridge according to the third embodiment of the present invention.

Meanwhile, with the disc cartridge according to the present invention, the optical pickup and the magnetic field generating device 100 reaching the outermost rim of the magneto-optical disc 31 are faced by the notch 93 of the cartridge main body 31. At least a part of the coil 102 of the external field generating device 100 intruding into the cartridge main body 34 by means of the recording/reproducing aperture 39 and brought into proximity of or into sliding contact with the major surface of the magneto-optical disc 31 may be intruded into the notch 93, as shown in FIG. 37.

Thus it becomes possible to scan the signal recording region of the magneto-optical disc 31 extending to close to the outer rim by the optical pickup and the external magnetic field generating device 100 across the inner and outer peripheries of the disc.

In the above embodiment, the abutment support extension 96a extended into the recording/reproducing aperture 40 is formed only at the abutment support 96 provided on the lower half 33. However, a similar abutment extension 97a extended into the recording/reproducing aperture 39 may also be formed at the distal end of the abutment projection 97 formed on the upper half 32 for providing a wider width of the abutment projection 97. By providing the abutment projection 97 of the upper half 32 and the abutment support 96 of the lower half 33 of increased widths, the reinforcement 94 formed by abutting the abutment projection 97 and the abutment support 96 is additionally improved in strength for additionally assuring the strength of the front side of the cartridge main body 34 which is reduced in width by the provision of the recording/reproducing apertures 39, 40 and lowered in strength by the provision of the groove 42.

In this case, the notch 93 is formed in each of the abutment support extension 96a formed at the abutment support 96 of the lower half 33 and the abutment extension 97a formed at the abutment projection 97 of the upper half 32.

Although the foregoing description has been made in connection with the disc cartridge D₂ housing the magneto-optical disc 31 with a diameter of 64 mm, the present invention may also be applied a disc cartridge housing a small-sized disc and which may be reduced in size in meeting with the disc.

With the disc cartridge according to the present invention, since the clearance for avoiding the protuberance resulting from the provision of the magnetic member on the disc substrate is provided on the inner surface of the cartridge main body, it becomes possible to prevent contact between the protuberance and the cartridge main body to prevent the debris from being produced.

In this manner, it becomes possible to prevent debris from being deposited on the write/read surface of the disc would interfere with recording and reproducing information signals.

Since it is unnecessary to increase the thickness of the cartridge main body to avoid the protuberance, it becomes possible for the cartridge main body to accommodate a small-sized disc and to reduce the size and the thickness of the disc cartridge.

With the disc cartridge of the present invention, since a plate support is formed at a position on the inner surface of the cartridge main body opposite to the magnetic plate provided on the disc, the magnetic plate may be supported by the plate support when a force uplifting the magnetic plate is applied by means of the aperture for the disc table formed in the cartridge main body, to prevent the magnetic plate from being detached from the plate support to render it possible to accommodate the disc safely and positively within the cartridge main body.

Above all, since the magnetic member is prevented from being detached, it becomes possible to prevent troubles in clamping the disc to the disc table.

With the disc cartridge of the present invention, since the abutment projections abutted and connected to each other are formed at a side edge of the recording/reproducing aperture which is formed at a corresponding position of each of the upper half and the lower half making up the cartridge main body for exposing at least a part of the signal recording region of the disc accommodated therein, and the side edges of the recording/reproducing aperture may be reinforced by abutting the abutment projections to each other, it becomes possible to prevent the cartridge main body from being flexed or deformed even if an external force is applied to the disc cartridge.

The shutter locking mechanism of the disc cartridge according to the present invention is provided on the shutter member. A shutter locking member has an independent flexible tab which is resiliently deflected when the locking arm is thrust. The shutter locking member is rotated about the pivot, while deflecting the flexible tab, for disengaging the mating engaging member of the shutter member. In this manner, the locking arm engaged with the shutter member may be formed with high accuracy to realize positive locking of the shutter member. That is, since it is unnecessary to provide a flexible portion in the locking arm, it becomes possible to form the various parts to size even if the parts are produced by molding synthetic resin.

Besides, since the shutter locking member is mounted by means of the pivot to the cartridge main body, the attachment and detachment operation is also facilitated.

What is claimed is:

1. A disc cartridge including an optical disc having a magnetic member attached to a central portion of one of two major surfaces of a disc substrate, said cartridge comprising:

a cartridge main body rotatably accommodating said optical disc, means for keeping clearance between an inner surface of said cartridge main body and a protuberance produced by attaching said magnetic member to said done of the two major surfaces of said disc substrate, said means being provided on the inner surface of said cartridge main body and surrounded by a first lug formed at a first position on the inner surface of said cartridge main body facing the magnetic member and a second lug formed at a second position on the inner surface of said cartridge main body facing said one of the major surfaces of the optical disc, wherein height of the first lug is less than the height of the second lug, such that the first lug is contacted by the magnetic member when the disc substrate is loaded onto a disc table inserted into the disc cartridge.

2. A disc cartridge according to claim 1, wherein at least one of the first lug and the second lug is an annular lug.

3. A disc cartridge according to claim 1, wherein the first lug is an annular lug having a diameter less than that of the magnetic member attached to the optical disc.

4. A disc cartridge according to claim 1, wherein said first lug comprises an annular lug.

5. A disc cartridge according to claim 4, wherein said first lug a diameter less than that of the magnetic member attached to the optical disc.

6. A disc cartridge according to claim 1, wherein said first lug is disc-shaped.

7. A disc cartridge according to claim 1, wherein said first lug comprises a plurality of projections.

8. A disc cartridge according to claim 1, wherein said first lug comprises a plurality of radial ribs.

9. A disc cartridge comprising:
a cartridge main body housing a disc-shaped recording medium therein and having an aperture for exposing a part of a recording region of the disc-shaped recording medium to the outside,
a shutter member movably mounted on the cartridge main body, and
a shutter locking means comprising a pivot at a proximal end thereof, a locking arm and a flexible tab facing each other and extended from said proximal end, said pivot being supported by a supporting shaft provided in said cartridge main body for rotatably supporting said shutter locking member about said supporting shaft as a center of rotation, said locking arm having an engaging recess engaged by an engaging means of said shutter member and the flexible tab having an abutment bead at a distal end of the flexible tab.

10. A disc cartridge to claim 9, wherein said cartridge main body comprises a reinforcement at side edges of said recording/reproducing aperture at an outer rim of the disc-shaped recording medium housed within said cartridge main body.

11. A disc cartridge according to claim 10, wherein said reinforcement is formed by abutting projections formed at the upper and lower cartridge halves.

12. A disc cartridge according to claim 10, wherein the front side of the cartridge main body along which the shutter member is slid is formed with a groove into which said shutter member is partially intruded, and in that abutment ribs are provided bridging the upper and lower cartridge halves within the inside of said cartridge main body between the front side of said cartridge main body and a top surface of an arcuate disc position controlling section at the front side of the cartridge main body.

13. A disc cartridge according to claim 9, wherein said disc cartridge further comprises means for keeping a clearance between an inner surface of said cartridge main body and a protuberance produced by attaching said magnetic member to said disc substrate, said means being provided on the inner surface of said cartridge main body.

14. A disc cartridge according to claim 13, wherein said clearance is surrounded by a first lug formed at the position on the inner surface of said cartridge main body facing the magnetic member mounted on the disc-shaped recording medium within the cartridge main body and a second lug formed at the position on the inner surface of said cartridge main body facing said one of the major surfaces of the disc-shaped recording medium.

15. A disc cartridge according to claim 9, wherein the engaging recess has a bottom wall and a side wall.

16. A disc cartridge according to claim 9, wherein a proximal side of the locking arm has a step created by removing a portion of the locking arm from its distal end.

17. A product by process comprising a disc cartridge having a synthetic resin, injection molded cartridge half, the cartridge half being rectangular and having a first aperture at a center for insertion of disc rotating and driving means and a second recording/reproducing aperture at the midpoint of a distance between the center and a lateral side of the cartridge half, said cartridge half having a recessed shutter slide area on an outer major surface thereof which borders the lateral sides and in which a shutter member for closing said second aperture is slid, wherein the cartridge half is made by a process wherein a gate for injection molding of synthetic resin is provided at a position close to said first aperture and offset towards the lateral side of the cartridge half with respect to the center in the sliding direction of the shutter member.

18. A product by process according to claim 17, wherein said gate for injection of the synthetic resin is inclined at a predetermined angle towards a side of said shutter slide area with respect to the center in a direction along the lateral side of the disc cartridge.

19. A product by process according to claim 17, wherein said gate for injection of the synthetic resin is inclined at 15 degrees towards the side of said shutter slide area with respect to the center in the direction along the lateral side of the disc cartridge.

20. A disc cartridge comprising:
a cartridge main body for rotatably accommodating a disc and formed by a molded, synthetic resin upper half connected to a molded, synthetic resin lower half,
recording/reproducing apertures formed at opposite positions of said upper half and said lower half, said recording/reproducing apertures exposing at least a part of a signal recording region of the disc to the outside, and
a recess formed in an edge of at least one of the apertures in the upper half or the lower half along the radius direction of the disc accommodated in the cartridge main body for providing a clearance between an edge of said recording/reproducing apertures and recording/reproducing means introduced into said recording/reproducing apertures.

* * * * *